US011132360B2

(12) United States Patent
Halstead et al.

(10) Patent No.: US 11,132,360 B2
(45) Date of Patent: Sep. 28, 2021

(54) ACCESSING DATASETS

(71) Applicant: Infosum Limited, Basingstoke (GB)

(72) Inventors: Nicholas Halstead, Basingstoke (GB); Eike Spang, Basingstoke (GB); Riki Dolby, Basingstoke (GB); Alistair Bastian, Basingstoke (GB)

(73) Assignee: Infosum Limited, Basingstoke (GB)

( * ) Notice: Subject to any disclaimer, the term of this patent is extended or adjusted under 35 U.S.C. 154(b) by 0 days.

(21) Appl. No.: 17/210,872

(22) Filed: Mar. 24, 2021

(65) Prior Publication Data

US 2021/0209097 A1 Jul. 8, 2021

Related U.S. Application Data

(63) Continuation of application No. 17/061,875, filed on Oct. 2, 2020, now abandoned.

(60) Provisional application No. 62/909,470, filed on Oct. 2, 2019.

(51) Int. Cl.
*G06F 16/24* (2019.01)
*G06F 16/242* (2019.01)
*G06F 16/2453* (2019.01)
*G06F 16/2455* (2019.01)
*G06F 16/22* (2019.01)
*G06F 21/60* (2013.01)

(52) U.S. Cl.
CPC ...... *G06F 16/2423* (2019.01); *G06F 16/2246* (2019.01); *G06F 16/244* (2019.01); *G06F 16/2456* (2019.01); *G06F 16/24545* (2019.01); *G06F 21/604* (2013.01)

(58) Field of Classification Search
None
See application file for complete search history.

(56) References Cited

U.S. PATENT DOCUMENTS

| 9,558,245 | B1* | 1/2017 | Gao | G06F 16/2465 |
| 10,515,106 | B1 | 12/2019 | Halstead et al. | |
| 10,650,414 | B1* | 5/2020 | Delker | G06F 16/9535 |
| 2005/0108001 | A1* | 5/2005 | Aarskog | G06F 16/248 |
| 2007/0143245 | A1* | 6/2007 | Dettinger | G06F 16/248 |

(Continued)

FOREIGN PATENT DOCUMENTS

| WO | 20180096062 | 5/2018 |
| WO | 20190030407 | 2/2019 |

Primary Examiner — Son T Hoang
(74) Attorney, Agent, or Firm — BainwoodHuang

(57) ABSTRACT

A method of accessing a dataset to fulfill a query over an intended audience is provided. A user interface comprises input means for a user to select an intended audience dataset from a plurality of datasets which the user has permission to access. The user interface is configured to receive from the user a query defining an intended operation to be performed on entries of the intended audience dataset to generate the target audience. The query is received from the user and a supporting candidate dataset is selected. It is determined whether the selected supporting candidate dataset comprises entries which enhance the entries of the audience dataset for performing the intended operation. If so, the candidate dataset and the audience dataset are selected to contribute to performance of the operation. If not, a next candidate dataset is selected, and the determining step is repeated.

16 Claims, 36 Drawing Sheets

(56) References Cited

U.S. PATENT DOCUMENTS

| | | | |
|---|---|---|---|
| 2015/0242407 A1* | 8/2015 | Frohock | G06F 16/21 |
| | | | 707/749 |
| 2017/0109014 A1* | 4/2017 | Gindi | G06F 16/26 |
| 2017/0193036 A1* | 7/2017 | Yueh | G06F 16/242 |
| 2018/0157761 A1* | 6/2018 | Halstead | G06F 16/9535 |

* cited by examiner

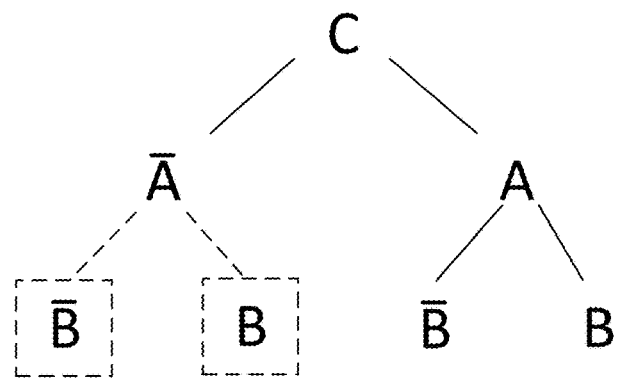
Figure 16a
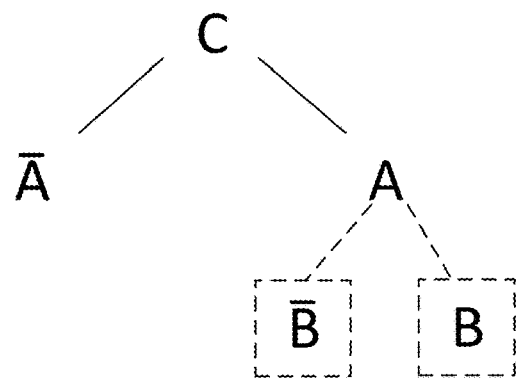
Figure 16b
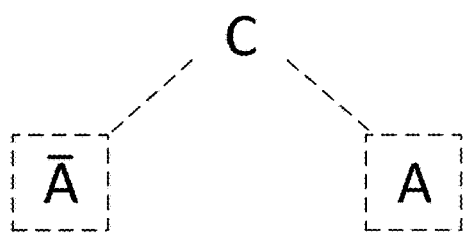
Figure 16c
C
Figure 16d

ACCESSING DATASETS

TECHNICAL FIELD

The present invention relates to accessing datasets, and particularly but not exclusively to selecting datasets to respond to a query having multiple expressions to render a response satisfying quality metrics.

BACKGROUND

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this. It is becoming an increasing requirement however to use more than one database to satisfy a single query. This can be for multiple reasons. Queries may be more complex, and have more expressions requiring a match. Some expressions may be fulfilled by one database, whereas other expressions may relate to information or data held in a different database.

There are a number of existing techniques for satisfying a query with multiple expressions where those expressions need to be fulfilled from different databases.

According to one technique, the two independent datasets are firstly merged together so that they exist as a single dataset (sometimes referred to as a data lake) which can then be queried with the multiple expressions. This procedure can require the transfer of large amounts of data, and a complex merging exercise at the receiving end. Any deficiencies in the origin datasets are carried over to the merged dataset. If new datasets become available, they have to be merged before a query can be run.

Sometimes, databases are available within a single "system" such that they can be in direct communication. A technique exists to query across such databases. For this technique a party has to be granted full read access to the databases to allow those queries. So there is no way of controlling the queries that are made on individual databases and therefore there is no way to keep the data secure. This is why the technique is only suitable for databases which are held on the same system. The technique is not suitable for databases held by independent owners who wish to keep their data secure and private.

Further disadvantages of the known techniques include the fact that data quickly becomes less valuable and useful as it goes out of date. This means that where data is collected into a single database from multiple independent databases, this has to be an ongoing procedure. Increasingly, privacy restrictions surrounding data means that providing data from one database into a combined database can come with restrictions around privacy issues.

A technique was developed by the present inventors to enable independent datasets to be searched without breaching privacy or security data regulations. Thus, WO 2018/096062 (the contents of which are incorporated by reference) describes a method of accessing multiple independent databases with a single query having multiple expressions, the method comprising:

deriving from a single query at least one filtering query containing at least one filtering expression and a target query containing at least one target expression;

searching a first one of the multiple independent databases using the at least one filtering query to obtain a filtering set of target entries matching the at least one filtering expression;

applying identifiers only of the filtering set of target entries and the target query to a second one of the multiple independent databases to search amongst the filtering set of target entries only in the second database for entries that match the target expression; and generating a set of result entries from the second database which thereby satisfy the filtering expression and the target expression.

The result entries can be supplied in a response message in the form of identifiers of records/entries in the second database. Alternatively (and more commonly), the result entries can be aggregated into groups according to attributes of the entries.

Examples of expressions which can be utilised as the filtering expression and/or the target expression include age/gender/geographical location. The technology may be referred to as data joining and has proved useful for a number of reasons.

Data joining may be employed to join internal data from databases belonging to the same entity, external data from databases owned by a plurality of entities, or data from databases physically located across different countries. For example when joining internal data, the data joining system provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared.

Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

In many cases, it can be advantageous for a user to have an idea of the intersection between two datasets—in particular the intersection between his own dataset and that of a third party. For example, a user's dataset may comprise medical data on one million people, and a second dataset may comprise financial records for two million people. The user may wish to know how many of the people for whom he has medical data are also to be found in the second dataset, because this means that the financial and medical data can, for these people, be correlated.

To address this, WO 2019/030407 (the contents of which are herein incorporated by reference) describes a method of determining a further dataset to be joined with a source dataset comprising a plurality of data entries each identified by a respective key, the method comprising: receiving an identifier of the source dataset; determining an intersection weight between the source dataset and each of a plurality of possible further datasets based on the number of common keys between the source dataset and each respective possible further dataset and generating an output based on the intersection weights for use in selecting, one of the plurality of possible further datasets to be joined with the source dataset.

In one system, the output which is generated for use in selecting one of the plurality a possible further dataset causes data to be presented to the user via a graphical user interface.

While this could be done by audio, the preferred technique is to provide clear visual information about the possible further datasets on the GUI. This information can include the intersection weights themselves and/or the datasets can be presented to the user on the GUI ranked according to their intersection weights with the source dataset. This provides a very simple visual 'marketplace' from which a user can readily envisage which dataset or datasets would be most beneficial to be combined with his own. This is particularly useful in the context of running a query over joint datasets.

SUMMARY

The technology described in WO 2018/096062 and WO 2019/030407 is extremely useful in enabling a data join to be accomplished in a decentralised fashion without the need to move raw data into a central store or between remote stores. Furthermore, enabling selection of different datasets provides flexible query options to users. However, the decisions which may be made by users are constrained by the information that is rendered available to them. Moreover, the quality of the join operation may vary significantly depending on the quality of the underlying data. A user may not be aware that their results are of a low quality, or the reasons why the quality of a particular query may be low.

There are many scenarios where a 'join' may be carried out, and different ways in which it can be implemented. The above described technology is one example of how databases may be combined, but aspects described herein may also be used with different combining technologies.

According to one aspect of the present invention there is provided a method of accessing a dataset to fulfill a query over an intended audience, the method comprising:
  generating a user interface to be rendered on a display of a computer device, the user interface comprising input means for a user to select at least one intended audience dataset from a plurality of datasets which the user has permission to access, each dataset having a plurality of data entries, each data entry having at least one key, the user interface being configured to receive from the user a query defining an intended operation to be performed on entries of the intended audience dataset to generate the target audience;
  receiving the query from the user;
  selecting at least one supporting candidate dataset from a plurality of candidate supporting datasets;
  determining whether the selected supporting candidate dataset comprises entries which enhance the entries of the audience dataset for performing the intended operation; and
  if so, selecting the candidate dataset and the audience dataset to contribute to performance of the operation and
  if not, selecting a next candidate dataset from the plurality of supporting candidate datasets and repeating the determining step.

In an example, the intended operation defines a join intent on the intended audience dataset and at least one further one of the plurality of datasets which the user has permission to access.

In an example, the join intent is a set operation.

In an example, the set operation includes one or more of: an exclude operation, a union operation, and an intersect operation.

In an example, the method comprises: partitioning the audience into disjunct partitions based on the one or more set operations; running the query over each partition separately; and aggregating the results of the query from each partition into a final result.

In an example, partitioning the audience into disjunct partitions comprises:
  generating a list of combinations of the datasets that are comprised within the audience, each combination being disjunct from all other combinations;
  identifying a disjunct partition by:
    i) sorting the list by instances of said combinations;
    ii) selecting from the list the dataset having the greatest number of possible combinations;
    iii) removing from the list any combinations which are not members of the selected dataset to produce a reduced list;
    iv) constructing a tree of the reduced list;
    v) pruning the tree by repeatedly removing leaves from the tree where a branch contains both a dataset and a negation of that dataset;
    vi) identifying the disjunct partition as the dataset defined by the pruned tree;
    vii) removing from the list the combinations comprised in the reduced list; and
    viii) repeating steps i) to vii) until no combinations remain in the list.

In an example, the method comprises configuring the user interface to receive a user indication of join intent.

In an example, the method comprises generating on the user interface a visual representation of the join intent.

In an example, the method comprises generating on the user interface a visual representation of the application of the join intent with a further one of the datasets.

In an example, the method comprises generating on the user interface, for a plurality of different further datasets, a respective visual representation of the application of the join intent with the respective further dataset.

In an example, the method comprises receiving user input confirming selection of one of the further datasets, and using the confirmed further dataset and the audience dataset to contribute to performance of the operation.

In an example, the at least one supporting candidate dataset comprises a via dataset storing associations between keys of a type present in the target audience and keys of a type present in a further dataset to be joined with the audience dataset.

In an example, the at least one supporting candidate dataset comprises an enrichment dataset storing attribute information for at least one of the entries of the target audience.

In an example, enhancing the audience entries comprises adding to the number of entries in the audience from the selected supporting dataset.

In an example, there are at least two supporting candidate datasets comprising:
  an enrichment dataset storing attribute information for at least one of the entries of the target audience; and
  a via dataset storing associations between keys of a type present in the target audience and keys of a type present in the enrichment dataset.

In an example, at least some of the data entries comprise one or more attribute and the query comprises a filtering expression defining at least one attribute value for filtering entries of the audience.

In an example, the intended operation is a filtering operation on attributes associated with entries.

In an example, the method comprises generating on the user interface a visual representation of results of the filtering operation.

In an example, the method comprises generating on the user interface a respective icon visually representing the respective datasets.

In an example, the user interface is configured to receive an aggregation expression for aggregating the result entries.

In an example, the aggregation is selected from: a count, an average, a maximum number, a top-n, or count-by-bins aggregation function.

In an example, the method comprises generating for display on the user interface a visual indicator representing the status of the results of the data aggregation, the visual indicator comprising: a first indication of the number of entries in the target audience having an attribute matching the filtering expression; a second indication of a total number of entries in the target audience having an attribute not matching the filtering expression; and a third indication of the number of entries in the target audience not having an attribute matching the filtering expression.

In an example, the visual indicator has visually distinct regions identifying relative proportions of the first, second and third indications.

In an example, each of the candidate supporting datasets has a user-defined quality metric, and said selecting at least one supporting candidate datasets is based on the user-defined quality metric, the user-defined quality metric indicating a value of the at least one key and/or a category of each candidate supporting dataset when used to enhance the entries in the target audience for which the intended operation is to be performed.

In an example, applying result entries resulting from performance of the intended operation to an identity database holding raw identifiers of entries in the intended audience.

Any of the techniques described in relation to enhancing entries of the audience dataset for performing the intended operation may be used to enhance application of result entries to the identity database.

In an example, the method comprises one or more via datasets storing associations between keys of a type present in the result entries and keys of a type present in the identity database.

In an example, the method comprises applying the result entries to two or more identity databases. The two or more activation databases may be broken down into partitions and the result entries may be applied to each partition independently (e.g. potentially using different via dataset(s), etc.), before the results are combined.

In an example, the method comprises applying result entries resulting from performance of the intended operation to an additional audience dataset prior to aggregating the result entries.

In an example, the method comprises using a query expression for aggregating results when accessing the additional audience dataset.

In an example, the operation comprises a data aggregation operation to be performed on the audience and selected candidate supporting database.

In some examples, the results of performing the operation may be stored in a database and the user provided with a unique ID and/or password for accessing the stored results. The results may have a lifetime after which they are erased from the database.

In an example, the method comprises executing a data aggregation algorithm which carries out the steps of:
  selecting one or more of the candidate datasets according to optimisation criteria based on at least one quality metric for the data aggregation operation pertaining to the join intent;
  searching the at least one audience data set or one or more selected ones of the candidate datasets using at least one first expression to obtain a filtering set of entries matching the at least one first expression;
  applying identifiers only of the filtering set of entries to one or more of the selected candidate datasets to search amongst the filtering set of entries only for result entries and aggregating the result entries;
  determining the value of the at least one quality metric based on the aggregated result entries; and
  comparing the value of the at least one quality metric with a threshold to provide an output indication of quality of the data aggregation operation.

According to a second aspect disclosed herein, there is provided a computer program product comprising computer-executable instructions stored on a non-transitory storage medium configured so as when executed by one or more processing units to perform a method of accessing a dataset to fulfill a query over an intended audience, the method comprising:
  generating a user interface to be rendered on a display of a computer device, the user interface comprising input means for a user to select at least one intended audience dataset from a plurality of datasets which the user has permission to access, each dataset having a plurality of data entries, each data entry having at least one key, the user interface being configured to receive from the user a query defining an intended operation to be performed on entries of the intended audience dataset to generate the target audience;
  receiving the query from the user;
  selecting at least one supporting candidate dataset from a plurality of candidate supporting datasets;
  determining whether the selected supporting candidate dataset comprises entries which enhance the entries of the audience dataset for performing the intended operation; and
  if so, selecting the candidate dataset and the audience dataset to contribute to performance of the operation and
  if not, selecting a next candidate dataset from the plurality of supporting candidate datasets and repeating the determining step.

According to a third aspect disclosed herein, there is provided a computing device for accessing a dataset to fulfill a query over an intended audience, the computing device comprising:
  a display; and
  a controller configured to:
  generate a user interface to be rendered on the display, the user interface comprising input means for a user to select at least one intended audience dataset from a plurality of datasets which the user has permission to access, each dataset having a plurality of data entries, each data entry having at least one key, the user interface being configured to receive from the user a query defining an intended operation to be performed on entries of the intended audience dataset to generate the target audience;

receive the query from the user;

selecting at least one supporting candidate dataset from a plurality of candidate supporting datasets;

determine whether the selected supporting candidate dataset comprises entries which enhance the entries of the audience dataset for performing the intended operation; and if so, select the candidate dataset and the audience dataset to contribute to performance of the operation and if not, select a next candidate dataset from the plurality of supporting candidate datasets and repeating the determining step.

According to a fourth aspect disclosed herein, there is provided a method of accessing a dataset to fulfill a query over an intended audience, the method comprising:

generating a user interface to be rendered on a display of a computer device, the user interface comprising input means for a user to define an intended audience dataset as one or more set operations on two or more datasets which the user has permission to access, each dataset having a plurality of data entries, each data entry having at least one key, the user interface being configured to receive from the user a query defining an intended operation to be performed on entries of the intended audience;

receiving the query from the user;

partitioning the audience into disjunct partitions based on the one or more set operations;

running the query over each partition separately;

aggregating the results of the query from each partition into a final result.

In an example, partitioning the audience into disjunct partitions comprises:

generating a list of combinations of the datasets that are comprised within the audience, each combination being disjunct from all other combinations;

identifying a disjunct partition by:

i) sorting the list by instances of said combinations;

ii) selecting from the list the dataset having the greatest number of possible combinations;

iii) removing from the list any combinations which are not members of the selected dataset to produce a reduced list;

iv) constructing a tree of the reduced list;

v) pruning the tree by repeatedly removing leaves from the tree where a branch contains both a dataset and a negation of that dataset;

vi) identifying the disjunct partition as the dataset defined by the pruned tree;

vii) removing from the list the combinations comprised in the reduced list; and viii) repeating steps i) to vii) until no combinations remain in the list.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 16a-d illustrate schematically an example pruning method;

DETAILED DESCRIPTION

Figure 1:
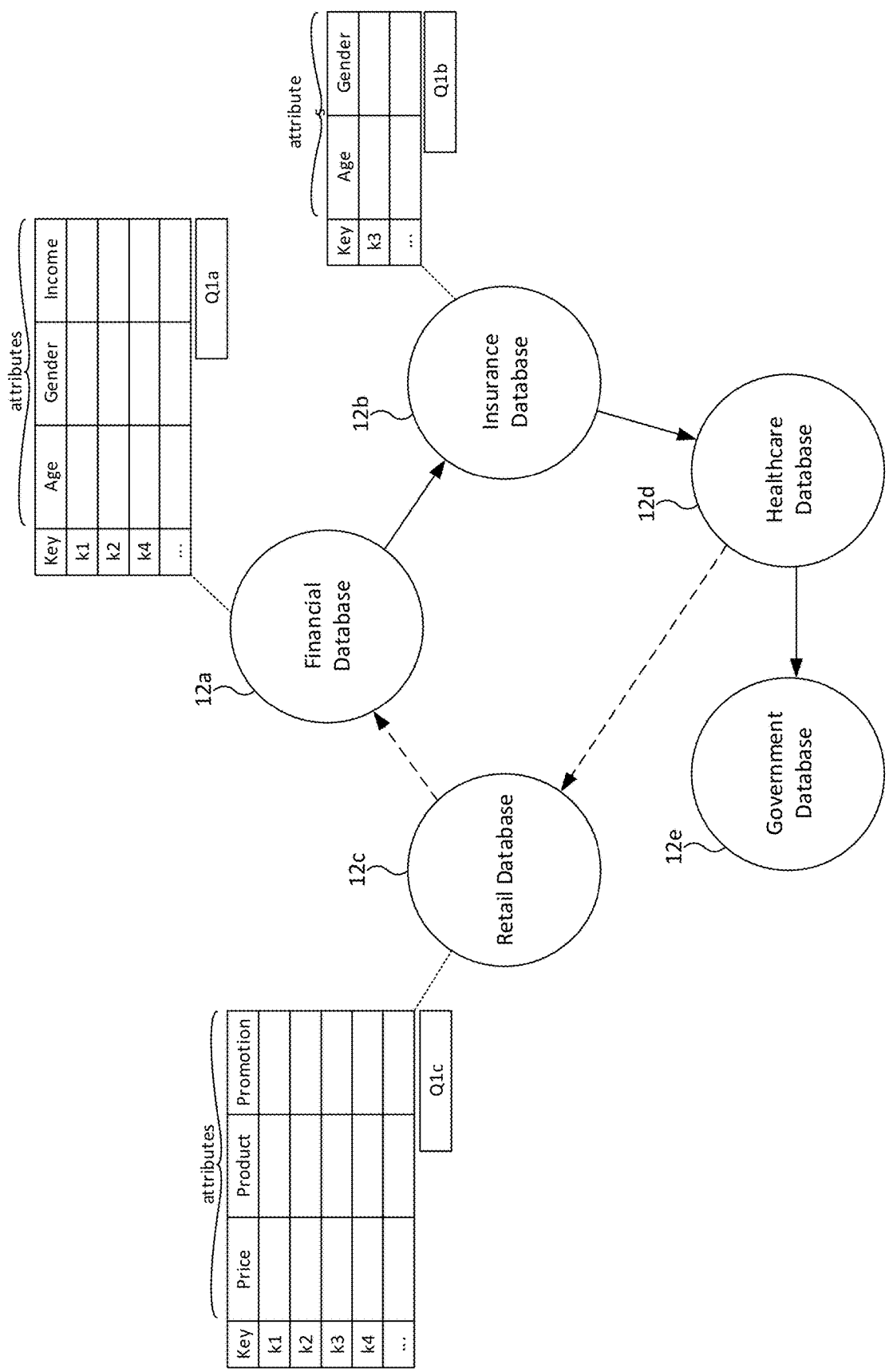
FIG. 1 is a schematic diagram of a set of databases.

Nowadays every company holds valuable data, for example concerning attributes of consumers or potential consumers who may wish to access that data. Sharing customer data among different companies creates complex privacy and legal issues, as the data contained in customer records may be shared involuntarily. The problem is exacerbated by the fact that different departments within the same company, or among different companies, may store data at different locations, and thus moving and selling data across sites poses security risks that may result in value leakage. Furthermore, different companies' storage formats are often not compatible which therefore increases the complexity in sharing customer data.

Furthermore, new datasets are being created continually. New datasets may be created because new companies are being established with different types of data, by the addition of attributes to existing datasets and by the proliferation of client facing user applications (apps) which gather user data. With such a proliferation of possible datasets which may be used to run queries over, it is an increasing challenge to make an effective selection of available datasets to optimise the quality of searches which are returned.

It is often desirable to define an 'audience' for a data query. As mentioned below the term "audience" is sometimes used synonymously with target or target audience. An audience is one or more dataset which is the subject of the particular query. It may be considered as a number of data entries, each entry defining an individual entity (for example a person). A target audience may be considered to be a desired collection of such entries, where "desired" is in the sense that certain requirements of the audience are to be met, as defined by a user who wishes to receive the results of the query. The requirements could be determined by the nature of a dataset itself, or attributes of entries in a dataset.

One particular challenge is to provide a user with the tools to understand the nature of an audience in one or more dataset, without the possibility or need to view in advance entries of the dataset. A number of such systems and methods are described herein, including the generation of quality metrics to assist a user.

Different quality metrics are discussed herein. However, a primary motivation is to make maximum use of datasets which are available to a particular user when they run the search. The general landscape of database searching will firstly be discussed. The following terms are used herein.

"Key"—the term key is used herein as an entity identifier of an entry in a database. An entry in a database may generally be considered as a row in a database, and sometime the two terms are used synonymously herein. However, databases may not necessarily be linear and arranged in rows. Examples of keys are names, telephone numbers, email addresses etc. They are intended to (but may not always) uniquely identify the entity in the database.

"Database"—the term database and datasets are used interchangeably herein to denote a structured set of data records. A data record is used herein synonymously with an entry in a database or dataset. In practice, a dataset may comprise multiple databases under a common control (not independent).

"Independent"—the term is used herein to denote a dataset or database which is under specific control with certain privacy and/or security restrictions on reading the data from it. The implication is that two independent datasets may not normally be merged or combined or have their raw data accessed by anyone but permission owners.

"Attribute"—in most databases, each entry comprises at least one key and at least one attribute. An attribute represents a value in a particular category of information. Categories may include for example, age, gender, income, price, product, promotions, health criteria etc. etc. An attribute may have a value and a category. For example, an attribute may have the category of age and a particular entry in a database may have a value in the age category of 39. Note that some databases may not have attributes and just constitute a set of keys (for example, a mailing list of email addresses mapped to account identifiers).

"Filter"—the term is used herein to denote an operation which is carried out on attributes to exclude attributes which do not have values falling into a certain range or above or below a certain limit. For example, a filter expression could be age greater than 40, or salary greater than £10,000.

"Aggregate"—an aggregate operation (or "function") is an operation which combines results of a search across one or more dataset into certain bins or bucket. Each bin or bucket may be one single value or a range of values of the attribute which is being aggregated. An aggregate operation could be a count of entries, a maximum number of entries, an average value or something else. There are many possible aggregation functions which could be used for this purpose. Examples include top-n and count-by-bins aggregations functions.

"Audience"—this term is sometimes used synonymously with target or target audience. An audience is one or more dataset which is the subject of the particular query. The term is often but not exclusively used herein to indicate the audience on which an aggregation operation will be performed from the results. However, there could be an audience for a pre-filtering operation.

"Supporting datasets"—In the following description, an optimisation algorithm enables selection of different supporting datasets to optimise the quality of a query. These datasets may be used to augment attributes which are missing from a primary source dataset and/or a target audience. One function of a supporting dataset is to enrich data by providing additional entries with the particular attribute. Another function of a supporting dataset is to enable a key conversion to be carried out to convert a first set of keys to a second set of keys to allow an additional dataset to be accessed using a second set of keys thereby to access additional entities with the particular attribute. The term "enrichment dataset" is used herein to define a supporting dataset which carries out an enrichment function. The term "via dataset" is used to define a supporting dataset which carries out a key mapping (or "via") function.

FIG. 1 is a schematic diagram of a set of databases. Reference numeral 12a denotes a first database (e.g. a database of a financial organisation) which holds certain records (entries). For example, each entry may have a key k1, k2 etc. and a set of attributes (in this case age, gender, income) for each entry. Reference numeral 12c denotes a second database (e.g. a database of a retail organisation) which holds certain records (entries). For example, each entry may have a key k1, k2 and a set of attributes (in this case price, product and promotion) for each entry. The attributes in one database may be different to the attributes in the other database. Some entities may exist in both databases (e.g. k1, k2), and the challenge is to combine knowledge from both databases by joining data in a fully privacy compliant way without any records leaving each company's data centre. Note here that an insurance database 12b may also hold age attributes, and that in this case there is an entry for k3 which is in database 12c but not in database 12a.

FIG. 1 shows schematically how data joining works for a data joining system with three organisations (Healthcare, Retail and Financial) shown by the dotted arrow, and for four organisations shown by bold arrows (Government, Healthcare, Insurance and Financial). In any case, queries can be created according to the existing datasets at each of the queried companies, in order to fully utilise all of the data available. A suitable filter, such as a list of hashes or Bloom filter, is created from a first attribute to be applied to one or more of the fields within each dataset to filter entries to be checked against a second attribute. Those entries in the dataset matching the second attribute run against the filtered entries are then returned as results. The joining of combined datasets creates greater knowledge than a single database can offer on its own and in some cases allow new datasets to be created. Common keys (or joining factors), such as email address or telephone number, are used to identify data associated with a particular entry across different datasets. In some cases, different common joining factors may be use depending upon their availability in the target datasets. The final results as presented to the user can be originated from any one of the queried organisations, but each of the returned results can be aggregated to meet individual privacy/redaction policies. Another type of operation run on the results is to identify particular entities who may then be targeted, using an ID database. This is described in our application U.S. patent Ser. No. 10/515,106, herein incorporated by reference.

In one example a retailer may cross-examine customers' transaction data and purchase history (e.g. price, product and promotion of past purchases) with their corresponding demographics data (e.g. age, gender and income) from the bank's dataset 12a, using email addresses as a common key (or joining factor). This provides a combined insight of customers and allows the retailers to create bespoke promotion strategies for their target customers.

Figure 2:
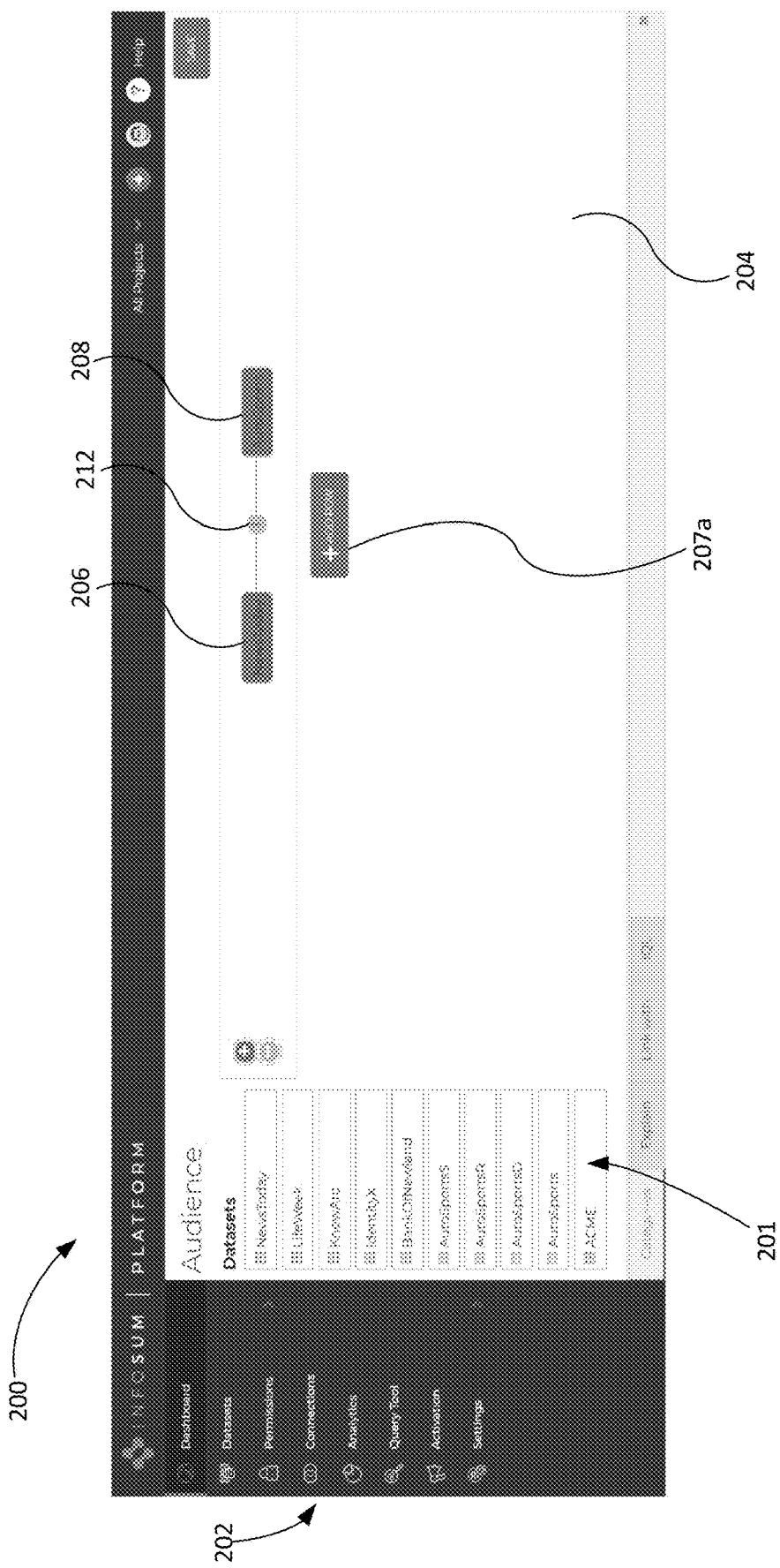
FIGS. 2 and 2a illustrate a user interface of a computer system for enabling a user to select datasets and to use a data joining service which combines different attributes from different datasets without the raw data being merged or moved.
Figure 2A:
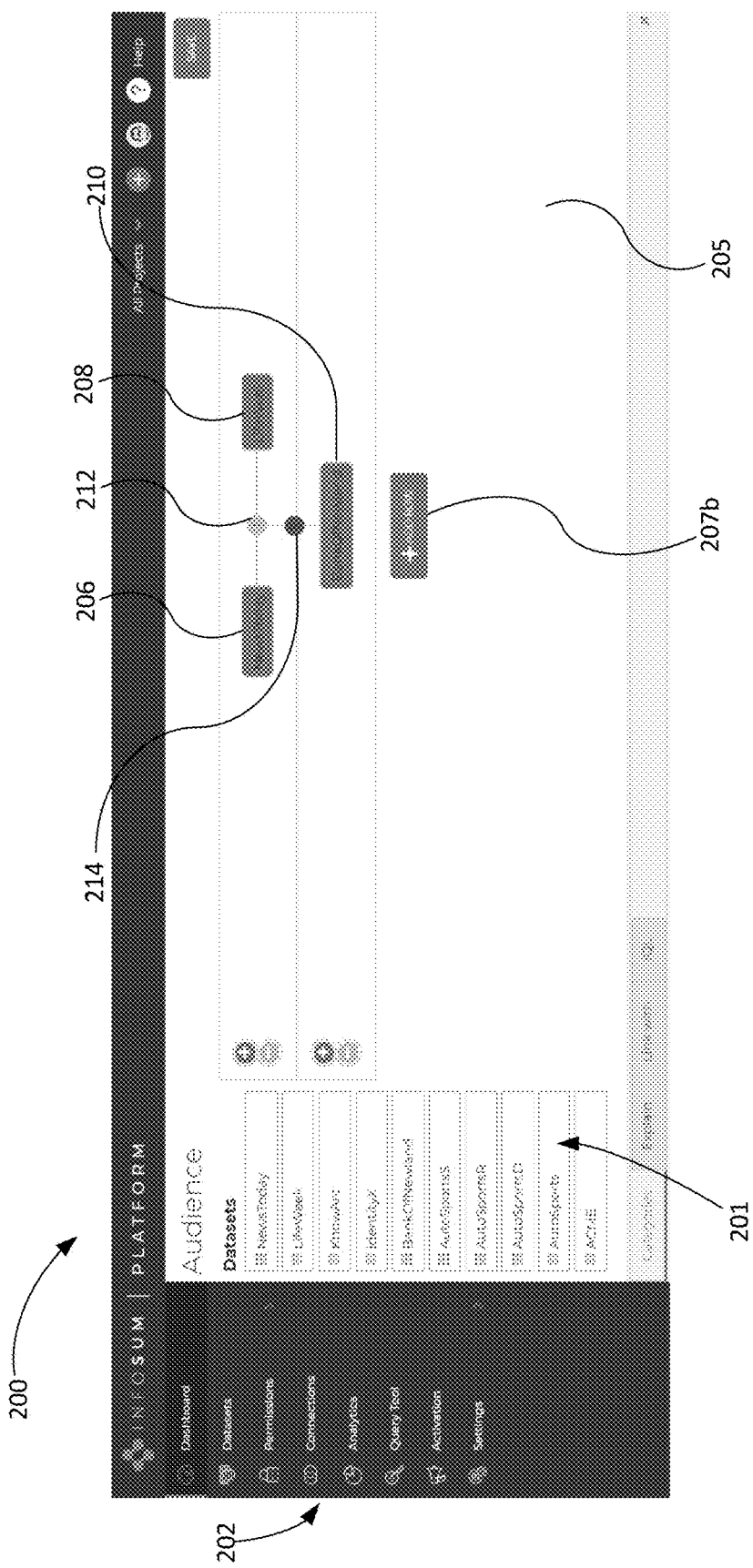

FIGS. 2 and 2a illustrate a user interface of a computer system for enabling a user to select datasets and to use a data joining service which combines different attributes from different datasets without the raw data being merged or moved. Such a data joining service is described in WO 2018/096062, but the interface adds additional user functionality which was not described in that case. FIG. 2 illustrates a user interface 200 at a first point in time. FIG. 2a shows the user interface 200 at a second, later point in time. A selection menu 202 on the left hand side of the interface enables a user to select different options for the user to activate the system via the interface.

The screen 204 shown on the interface 200 in FIG. 2 enables a user to select from a plurality of offered datasets and then create a target audience by specifying a join operation between those datasets. Selection between the datasets was made via a prior screen which is not shown. For example, the user may "drag and drop" datasets from a list 201 of available datasets (illustrated on the left in FIGS. 2 and 2a).

In the screen 204, a dataset storing keys and attributes for readers of the NewsToday newspaper is represented by icon 206. A dataset storing keys and attributes of readers of the LifeWeek newspaper is represented by icon 208. The user has selected an intersect operation (described later) on these two databases. This intersect operation being represented by a visual indicator 212 in the form of an icon marked "I". For example, when the user selects (e.g. drags and drops) a second dataset, a connector may appear between the datasets with a visual indicator 212 of the connection type (e.g. intersect, union, exclude, etc.), possibly with a default connection type. The visual indicator 212 may allow the user to change the connection type by, e.g. clicking on the visual indicator. A button 207a allows the user to add a new row to the dataset construction, as described below.

FIG. 2a illustrates a subsequent screen 205 on the user interface 200 shown in FIG. 2. The user has added a second row using button 207a shown in FIG. 2. A new button 207b may allow the user to add further rows in a similar manner.

For this particular query, the user has further selected a third dataset with keys and attributes of customers of the BankofNewland bank represented by icon 210 and has indicated an additional join operation "exclude" denoted by a visual indicator "E" 214. The ability of the user to specify the intent of his join has important ramifications when considering the quality of the results, as described later. The intent of the query enables the user to define an audience for the query. In the example of FIG. 2, the audience is defined as dataset A INTERSECT dataset B EXCLUDE dataset C, where dataset A is NewsToday readers, dataset B is Lifeweek readers and dataset C is BankofNewland customers.

Another example of an audience definition could be dataset A union dataset B.

Figure 4A:
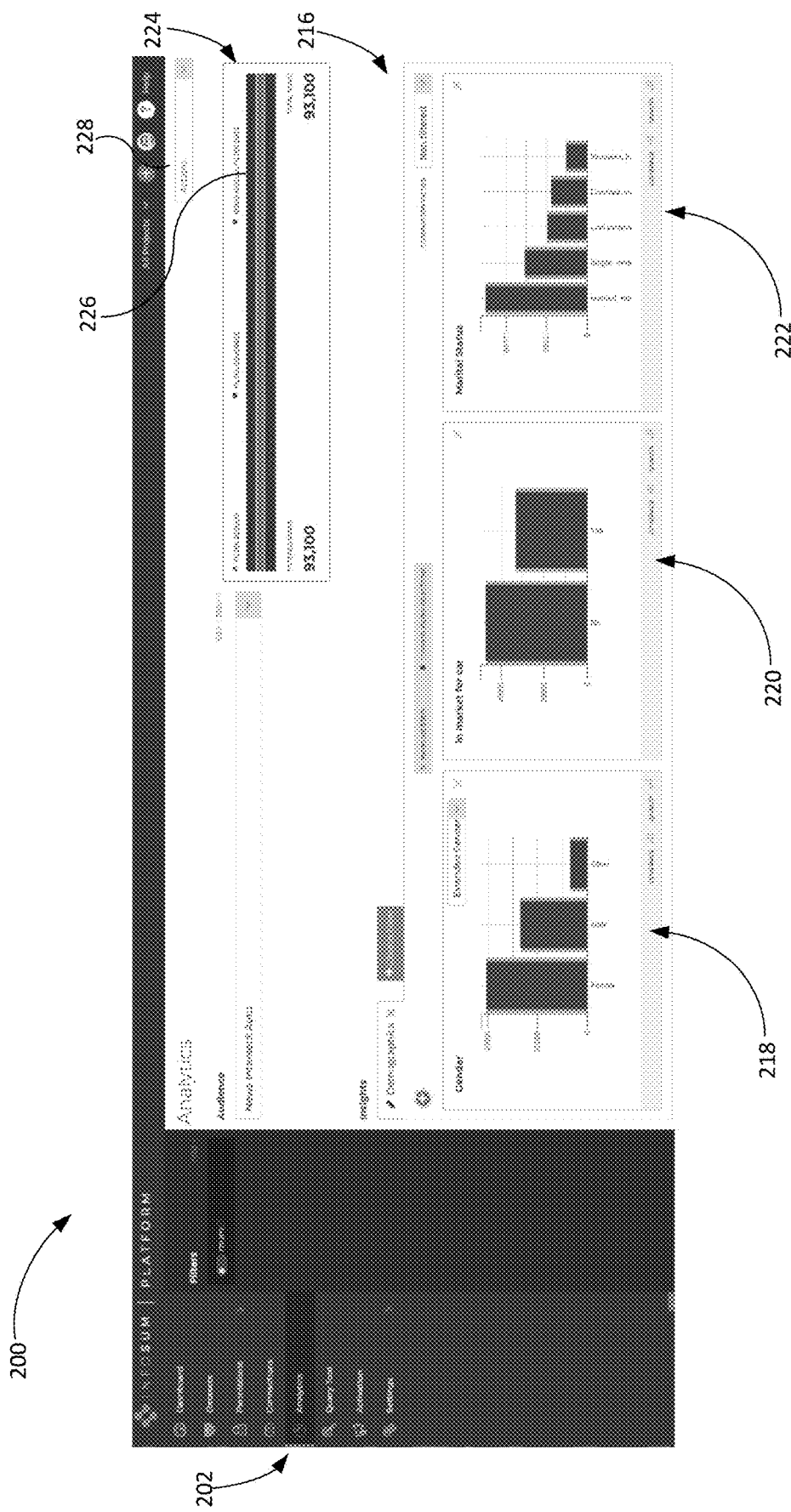
FIGS. 4a, 4b and 4c illustrates example analytics screens on the user interface.
Figure 4B:
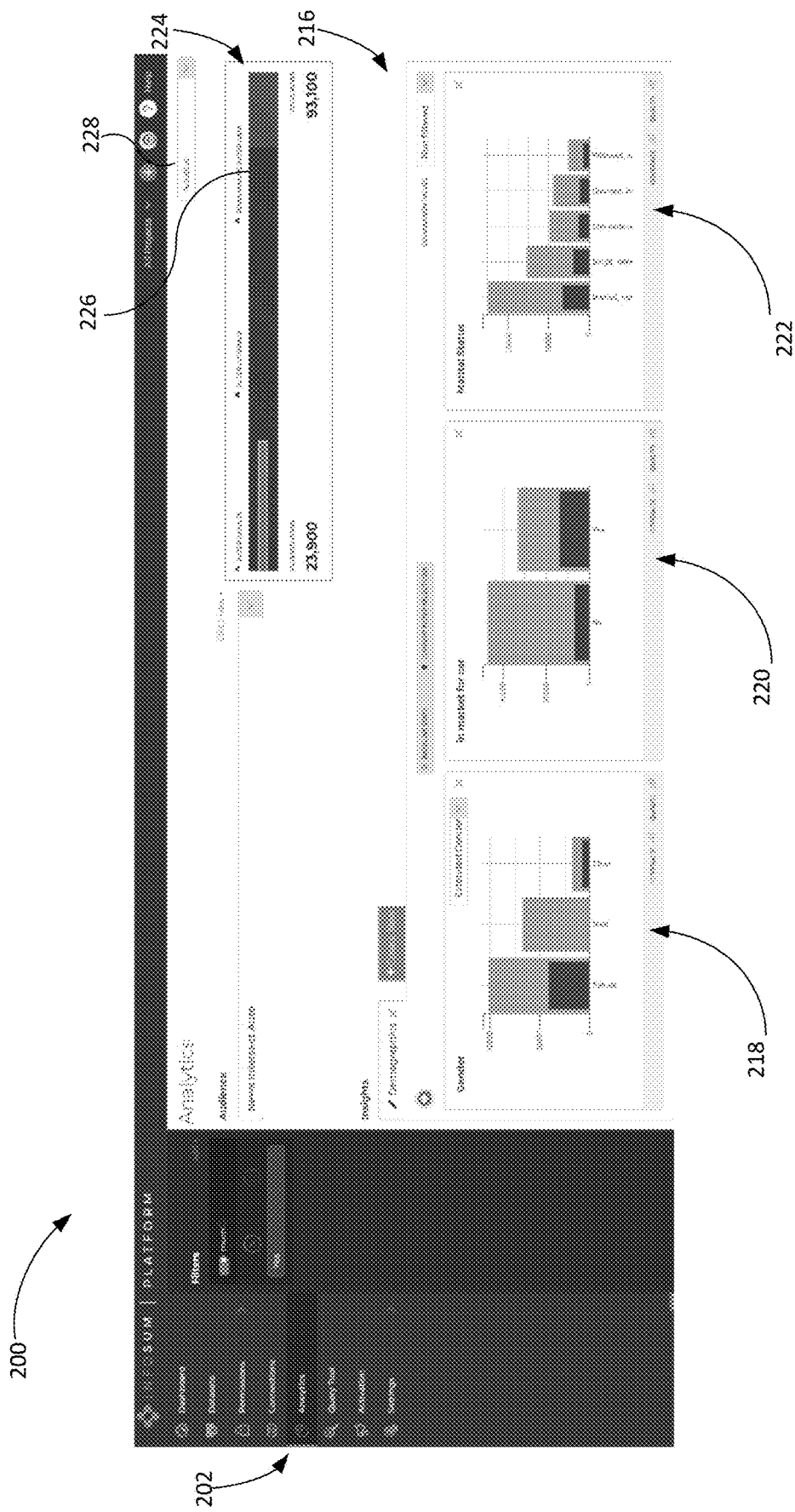
Figure 4C:
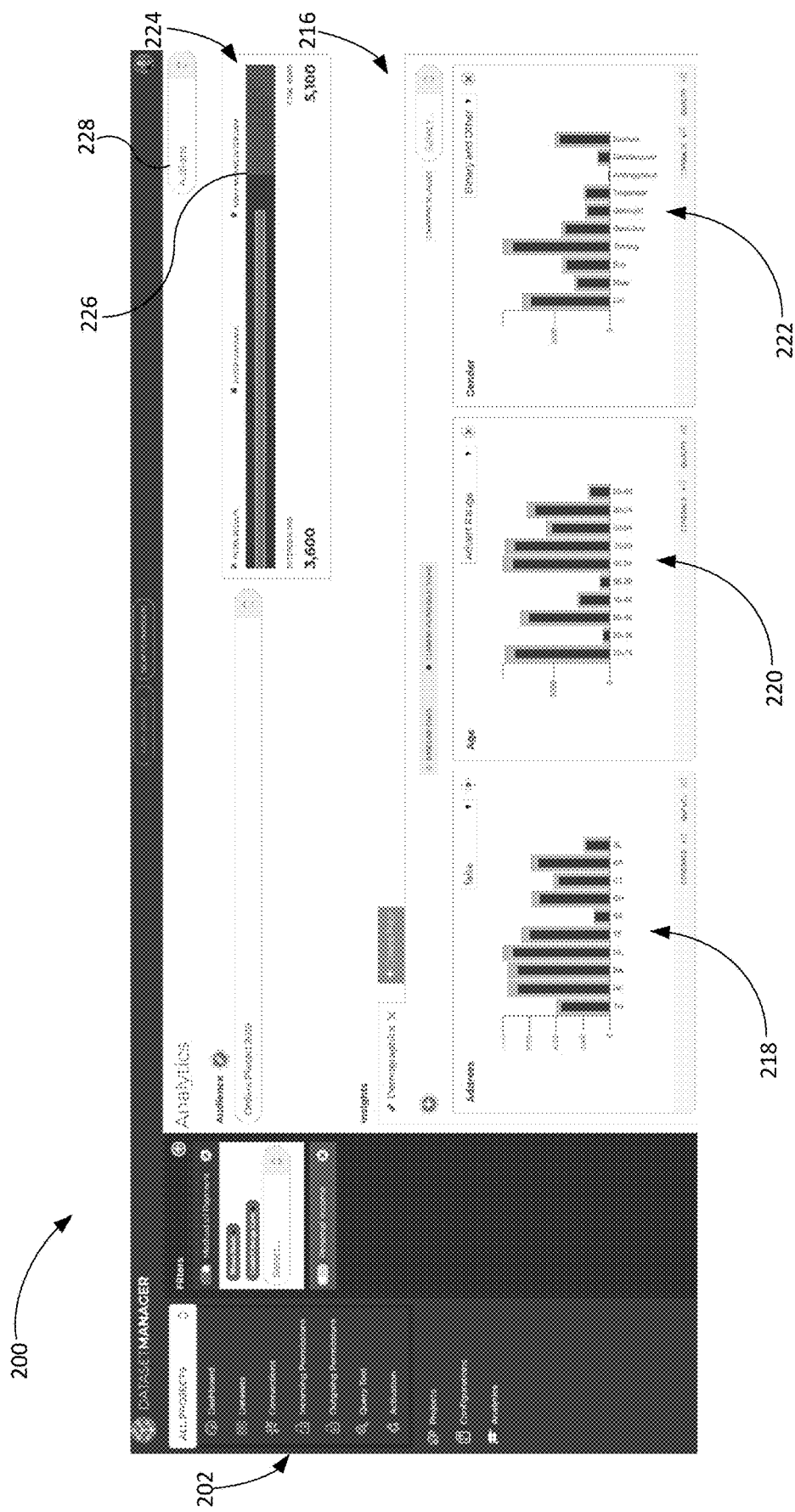

FIGS. 4a and 4b illustrate an analytics screen 216 on the user interface 200 for presenting the user with results. In each example, the audience ("News Intersect Auto") has been defined as described earlier in relation to FIGS. 2 and 2a. A further example is shown in FIG. 4c and discussed later.

In FIG. 4a, no filter is applied and hence all the entries in the audience are represented. In the lower part of the screen, three different aggregation outputs are provided:

The graph 218 indicates the distribution of the audience by gender.
The graph 220 denotes the distribution by a criterion indicating whether they are in the market for a car.
The graph 222 shows the distribution by marital status.

The particular bins used in creating the distribution may be selectable by the user, e.g. using a drop-down menu. For example, in this case the user has selected an "extended gender" representation for the bins in graph 218 comprising bins "female", "male", and "other". Other sets of bins may be available such as "traditional gender" comprising only "female" and "male". As another example, the marital status in graph 222 has been binned using "married", "single", "civil partnership", "divorced", and "widowed". A different representation of marital status could be simply "married" or "not married", in which case there would only be two bins in the distribution.

In addition to the graphical aggregation distributions which may be shown to a user, a visual indicator 224 is also generated. This visual indicator indicates the quality of the results displayed to the user. The visual indicator indicates the total number of rows in the target audience, in this case 93,100. As mentioned, in FIG. 4a no filter has been applied and therefore all of the results are represented (i.e. 100% of the results are represented in the graphs 218, 220 and 222.

FIG. 4b illustrates the analytics screen 216 on the user interface 200 but this time with a filter ("mum") enabled. This example filter filters for entries (people) in the audience who are mothers ("mum=true"). The results in graphs 218, 220 and 222 are modified in view of the filter. That is, the aggregated distributions once the filter is applied are shown. In this example, the filtered results are presented on top of the unfiltered results, thereby providing an intuitive visual indication of the effect of the filter. For example, it can readily be seen that one effect of the filter "mum-true" is to remove all the gender=male entries from graph 218.

In this case, the visual indicator 224 further indicates for how many of the rows of the audience the algorithm has been able to locate filtering information (i.e. in this example for how many people there is motherhood information available). The visual indicator 224 is described in more detail later with reference to FIGS. 8a and 8b.

The ability to define the audience allows the system to address a challenge present in the earlier technology. As briefly described above, a suitable filter is created from the first attributes to be applied to one or more of the fields of a source dataset. This could be termed a filtering attribute. A criteria is defined for the filtering attribute (for example, age less than 40).

The resulting filtered set of identifiers (keys)(or an encrypted—hash or bloom thereof) is then applied to a further dataset for matching a second attribute and to generate a resultant set of data. With the prior system it was not possible to distinguish between a resultant set being small for the reason that there were only a small number of individuals matching the filter criteria, or the reason that there were only a small number of rows in the defined audience that were able to be matched with the dataset that provided the filter attribute data. The definition of the audience allows the system to distinguish between these two different reasons. The first reason would be a valid reason to return a small dataset. The second reason, however, is an indication that the quality of the search may not have been optimum. Either the audience dataset did not have a sufficient overlap of keys with the filtering datasets or the filtering datasets or audience datasets were lacking insufficient attribute data for the filtering attribute.

The present system may also be effective without filtering attributes being used. There is a distinction between a selection of records captured by user intent (such as an audience definition as above) and filtered records that may be sent to an activation (tagging) bunker as described later and in our U.S. patent application Ser. No. 10/515,106, herein incorporated by reference. The optimization algorithm discussed herein may be applied in both cases.

In addition to enabling the audience to be defined, the present system provides an additional quality optimisation features. A user may bring his own insight into the quality of particular datasets. For example, a user may have knowledge of the relative value of the key or the category information in a dataset. Reverting to FIG. 1, each dataset could be associated with a quality indicator QIa, QIb, QIc etc. Quality indicators may have a qualitative parameter—that is, high quality keys, such as subscriber ID or high quality categories, such as age. Quality indicators may have quantitative information such as "address data up to date as of <a certain period> ago".

One aspect of input quality concerns the value of the keys. As described earlier, WO 2019/030407 describes a method of determining the size of an intersection between datasets based on the proportion of overlapping keys. On the face of it, this would be a good indicator that two datasets should be utilised in a query for maximum coverage. However, a particular user may understand that a certain key (for example, a subscriber ID) is more likely to be accurate and consistent than an alternative key for identifying a reader, such as an email address. A user may determine that subscriber ID is a more valuable key even where an email address has 100% coverage in a particular dataset while subscriber ID only 70%. Note that this reference to coverage is within each dataset itself, although the same quality issue may be taken into account when determining intersections.

Another example of input quality relates to category information, such as address information. For example, both the insurance databases 12b and the retail database 12c may hold address information (although this is not shown in FIG. 1). However, a user knows that a retail database 12c has more up to date addresses than the insurance database 12b. Therefore, when he has a query involving an address attribute, he may select the retail database as part of a candidate set in preference to the insurance database when considering that attribute.

Figure 3:
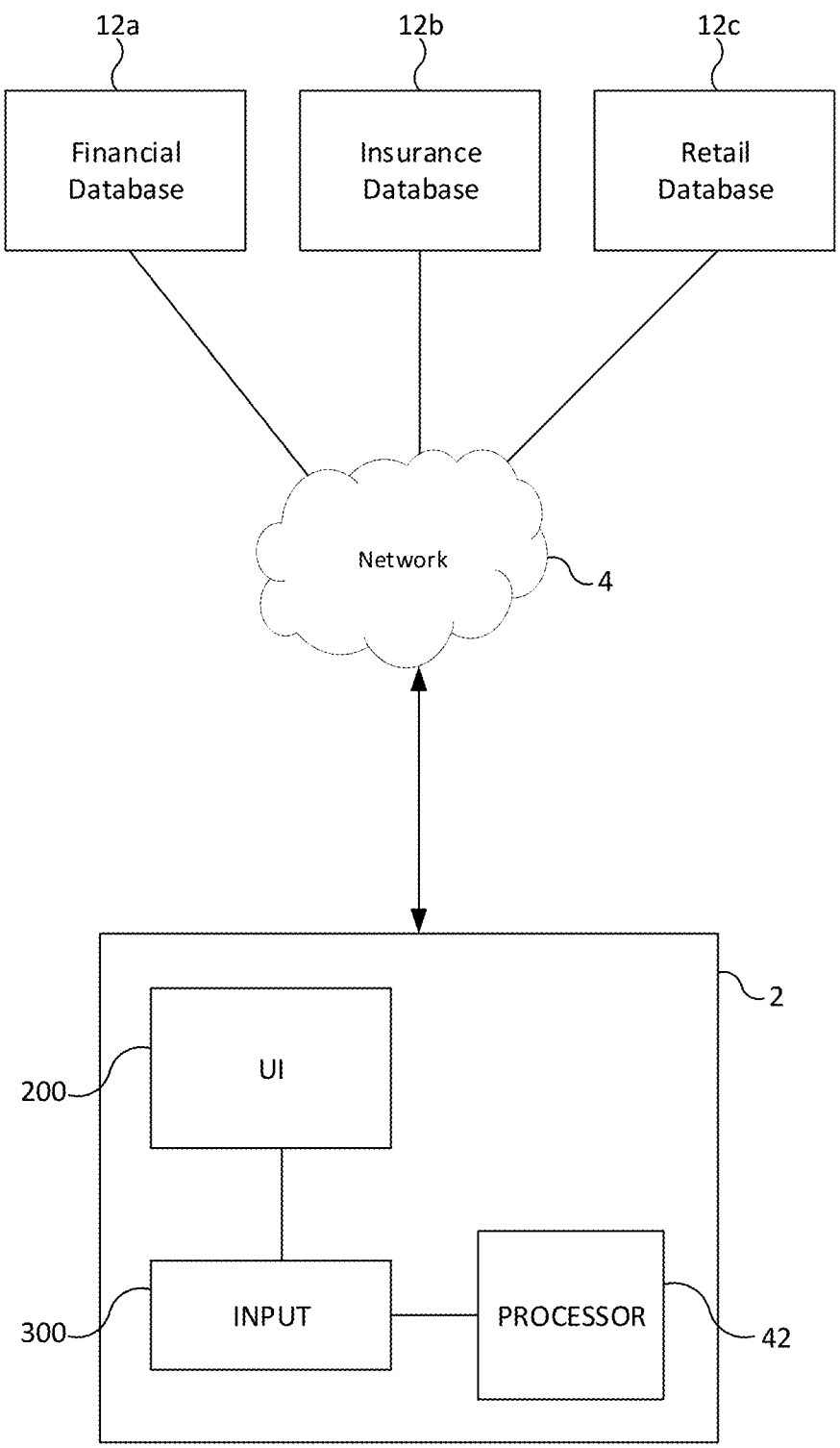
FIG. 3 is a highly simplified schematic diagram of the architecture of a data joining system.

The join operation described herein may be optimised dynamically at query time by the application of an optimisation algorithm by the system. FIG. 3 is a highly simplified schematic diagram of the architecture of a data joining system. A computer 2 provides the user interface 200, a control processor 42 and input means 300 by means of which a user may engage with the user interface. The input means may be a touch screen, keyboard, audio interface or any other known way of engaging with the user interface of a computer system. The processor 42 holds one or more computer programs stored on computer readable media and has a processing engine capable of executing the one or more computer programs to deliver the functions described herein. In particular, the processor 42 executes code for generating the user interface and responding to user interactions on the user interface, and an optimisation algorithm which is described herein. The computer system 2 is connected to a network 14 which may be a public or private network and can access a plurality of databases via the network. Note that while three databases are shown, in reality there may be hundreds or thousands of databases accessible to the controller for the conducting of queries.

The computer system described herein provides the user with a number of user options which may be used alone or in combination. According to one option, a user is allowed to specify a pool of candidate supporting datasets that may be used by the processor 42 as a starting point for the optimisation algorithm.

Alternatively or additionally, a user may be given filter and aggregation choices to impact the datasets selected. These two features may be used in combination. For example, a user may specify a pool of datasets, and then the optimisation algorithm may select certain datasets from that pool based on the user's filter and aggregation choices. Note that this pool of datasets may be distinct from the definition of the target audience. The datasets represent a pool of candidate supporting datasets which may be used for enrichment or via operations which improve the quality of the results returned from the query. The user may select the pool of candidate supporting datasets from a set of datasets generated on the user interface. For example, a user may use a touch screen or mouse click to select candidate supporting datasets. Alternatively, they may enter identifiers of the datasets into selection fields presented to them on the user interface. Once a candidate pool of supporting datasets has been selected by a user, other datasets available to the computer system 2 will be ignored in execution of the optimisation algorithm. The optimisation algorithm will seek to choose the best datasets from the pool of candidate supporting datasets chosen by the user.

In one embodiment, a user may override automated behaviour carried out by the optimisation algorithm. For example, the optimisation algorithm may generate its status on the user interface by indicating which datasets it has selected for enrichment of a particular key or particular category (or via). A user may override this behaviour by selecting an alternative dataset or removing the automatically selected dataset from the join operation.

The function carried out by the optimisation algorithm will now be described. A user who wishes to conduct a query may provide to the user interface (in addition to the selection of a candidate pool and target audience) a filtering attribute and an aggregation attribute. In each case, there may be more than one filtering attribute and more than one aggregation attribute. Optionally, the user may further provide a quality indicator for use by the optimisation algorithm. By enabling an optimisation to be carried out dynamically at query time for the defined join operation on the defined target audience, the user's filter and aggregation choices can be utilised to impact the datasets selected from the candidate pool to optimise the results for that target audience and that join operation. For example, selecting a particular key K1 to perform a query between dataset A and dataset B might provide best coverage overall, but a particular filtering attribute criteria could cause a different outcome. For example, K1 might provide the best coverage between dataset A and dataset B when considering the presence of age as an attribute. However, if a filter is applied, for example age less than 40, the number of entries of key K1 or the quality of K1 may drop in favour of a different key K2. Issues such as coverage or skew which may impact these considerations are described later.

For a given audience specified by the user, the function of the optimisation algorithm is to select any additional datasets to provide the category information required to calculate the selected aggregations and filters. It will be appreciated that useful results may also be gained with no filters or attributes as further described herein.

This category information can come from the audience datasets themselves in the first instance. However, if the coverage in the relevant categories of the audience datasets themselves is insufficient, additional datasets may be selected from the candidate pool to support the query. To take a simple example, consider again FIG. 1. The retail database has entries for four entities identified respectively by keys k1, k2, k3 and k4. A filtering attribute of age has been specified. The financial database 12a has entries for the entities identified by keys k1, k2 and k4 but not k3. However, the insurance database 12b does have age information for k3. Thus, the insurance database could be used as an additional enrichment dataset to extract age information from the entity defined by k3 to support the query. In this particular case, it is assumed that the keys are all the same (for example, they all represent the name of an entity). That is, suitable matching keys exist directly in the supporting databases. If suitable matching keys do not exist directly, a key conversion (via) dataset may additionally be required. Such a dataset can be used to convert one key (for example, name) to another key (for example, email address), such that an enrichment dataset which had email addresses as the keys could be utilise for the particular category.

The optimisation algorithm can be equally applied to selecting the best via dataset(s) as well as the best enrichment dataset(s)

In one particular case, the algorithm may be seeking size of an audience (rather than trying to draw insights by exploring attributes). The aggregation is a 'Count' operation—but if the audience datasets don't directly share keys then the algorithm will need to select one or more via datasets to perform the key conversion Consider the following example:
Audience=X Union Y Intersect Z [Z doesn't share keys with X or Y]
Via set=A, B, or C
Function=Distinct Count of audience size.

Maximising the accuracy/coverage of the relationship between Z and (X Union Y) is the optimisation challenge.

In another scenario, the Activation (Tagging) scenario as described in U.S. patent Ser. No. 10/515,106, there is an additional dataset (activation bunker) as a destination.

In this scenario the optimisation is a combination of via and enrichment to build the target audience segment and then an additional optional via step as we try to map that resultant audience on to the activation bunker.

Consider the following example:
Audience=T Intersect X Intersect Y [T is a target activation bunker (containing no attributes) and neither X or Y has Age]
Filter=Age <40
Enrichment set=A, B or C
Via=B, C or D
Function=Activation via Dataset T (emitting T identifiers, e.g. cookieIDs).

The algorithm forms an intersection of X and Y—then uses the best enrichment dataset(s) to enrich with Age and filter to Age <40. This resultant audience is matched with target Dataset T to emitting T identifiers. If X and Y do not share a key with T then via Datasets B, C or D will be used to maximise the coverage of the result audience set in the delivered set of T identifiers.

In addition, note that it may be necessary to use key conversion (via) datasets to form the audience itself where there are no direct keys for matching in the defined audience dataset, or if any such direct keys which are available do not provide enough coverage. In this context, coverage means the number of rows available in each dataset with matching keys. For example, a second dataset may have matching keys for 30% of the rows of a first dataset.

The aim of the optimisation algorithm when selecting the additional datasets is to maximise one or more of the following criteria:
coverage of the audience itself;
coverage of the audience between the candidate enrichment datasets and the audience;
coverage of the categories required for any aggregations;
coverage of the categories required for any filters;
consistency between category data.

Consistency is a criteria which applies when considering two or more datasets. If more than one dataset is selected to provide good coverage for a category, the data between those datasets should agree as much as possible. This can be calculated a priori or dynamically when filters are taken into account. For example, it is possible that datasets may provide good consistency for age greater than 40, but poor consistency for age less than 40.

A further function of the optimisation algorithm is to minimise key skew and category skew.

If different datasets within the audience have different key coverage, it is important to avoid bias towards one dataset over another (key skew). This is discussed in more detail later.

If keys and categories have significant relationships, it is possible that the results may be biased (category skew). This is discussed in more detail later.

Key skew and category skew pertain to the quality of the search results from the algorithm.

There are other performance metrics which the algorithm may take into account, including traffic flow and time. Platform performance optimisation requires the least number of transfers of information and the least amount of data transferred. Note in this context that the data which is transferred is not the raw database data, but filtering sets, user indicators etc. Furthermore, rapid processing of queries is clearly a user benefit.

One example optimization algorithm will now be described. Other examples are given later below in relation to FIGS. 14-16.

First, the audience is partitioned into subsets of users described by different keys or combinations of keys. The independency of these subsets is determined. For example, consider the following audience: (A union B), in which A has keys K1 and K2, and B has keys K2 and K3.

In this case, the following subsets (KeySets) are possible:
A→K1; A→K2; A→K1¬K2; A→K2¬K1; A→K1&K2
B→K2; B→K3; B→K2¬K3; B→K3¬K2; B→K2&K3
A Intersect B→K2; A Intersect B→K2¬K1; A Intersect B→K2¬K3; A Intersect B→K2¬(K1|K2)

Some of these KeySets are clearly independent of each other, e.g. A→K1¬K2; A→K2¬K1; A→K1&K2. Some other KeySets are clearly not independent, e.g. A→K1; A→K1¬K2. If any two or more non-independent KeySets are used to create improved coverage, then duplicates would be generated. Hence, the following actions can be performed:

Phase 1:

For each KeySet and for each Category (in filter and aggregation), evaluate the coverage in the Audience. (Row count vs total rows in the audience). (The Category information may be sourced from either audience datasets or enrichment datasets).

Phase 2

If Phase 1 step results in subset of audience where results are Unknown—create a new set of KeySets for this remainder and repeat Alternatively, it is possible to optimise resultant audience coverage. In this case, where KeySets create independent audience sections, the results are summed to improve coverage. Then, sibling selection may be considered in order to evaluate other option paths. It is also possible to score the results on Input Quality/Skew/Consistency to determine which combination of KeySets will be used for each Category to maximise final result.

Other arrangements are possible. For example, the algorithm could start by initially using whichever data set has the highest overlap with the audience, or meets a certain threshold. Alternatively, all datasets in the candidate pool could be tried, and the best selected using a quality metric.

Another feature of the present system is the ability to indicate to a user the quality status of the query by a visual indication on the user interface 200. FIG. 4c illustrates an analytics screen 216 on the user interface 200 similar to described earlier with reference to FIGS. 4a and 4b. In this particular case, the filtering metric on the defined audience was orders placed in 2018 (defined earlier, for example, in a manner similar to that described in relation to FIGS. 2 and 2a). In the lower part of the screen, three different aggregation outputs are provided as results:

The graph 218 indicates the distribution of the audience by country.

The graph 220 denotes the distribution by age, where each aggregation bin has an age range defined in relation to target advert audiences.

The graph 222 shows the distribution by gender.

In this case, the visual indicator 224 indicates the total number of rows in the target audience, in this case 5,100. It further indicates for how many of those rows the algorithm has been able to locate information (either in the target audience or through enrichment and via operations) which have data about orders placed and match the criteria of the query (orders placed in 2018). In this case, that number is 3,600. Some data is lost because it is not covered by the filter criteria. The proportion of the number of rows to the total number of rows is shown by a separation line 226 and different colours or hashing on either side of the line. In addition, there is a further visual indicator to indicate within the 3,600 rows that have order information which of those satisfy the criteria of orders placed in 2018.

Having presented an indication of the result quality to a user, the user interface offers the user different alternatives in an actions menu 228. Example actions are saving a report of the graphs or saving and sharing the audience and/or filters. When the resultant audience is post-filtered data (e.g. in sketch form), the resultant audience may be sent to an activation (tagging) dataset.

Figure 6:
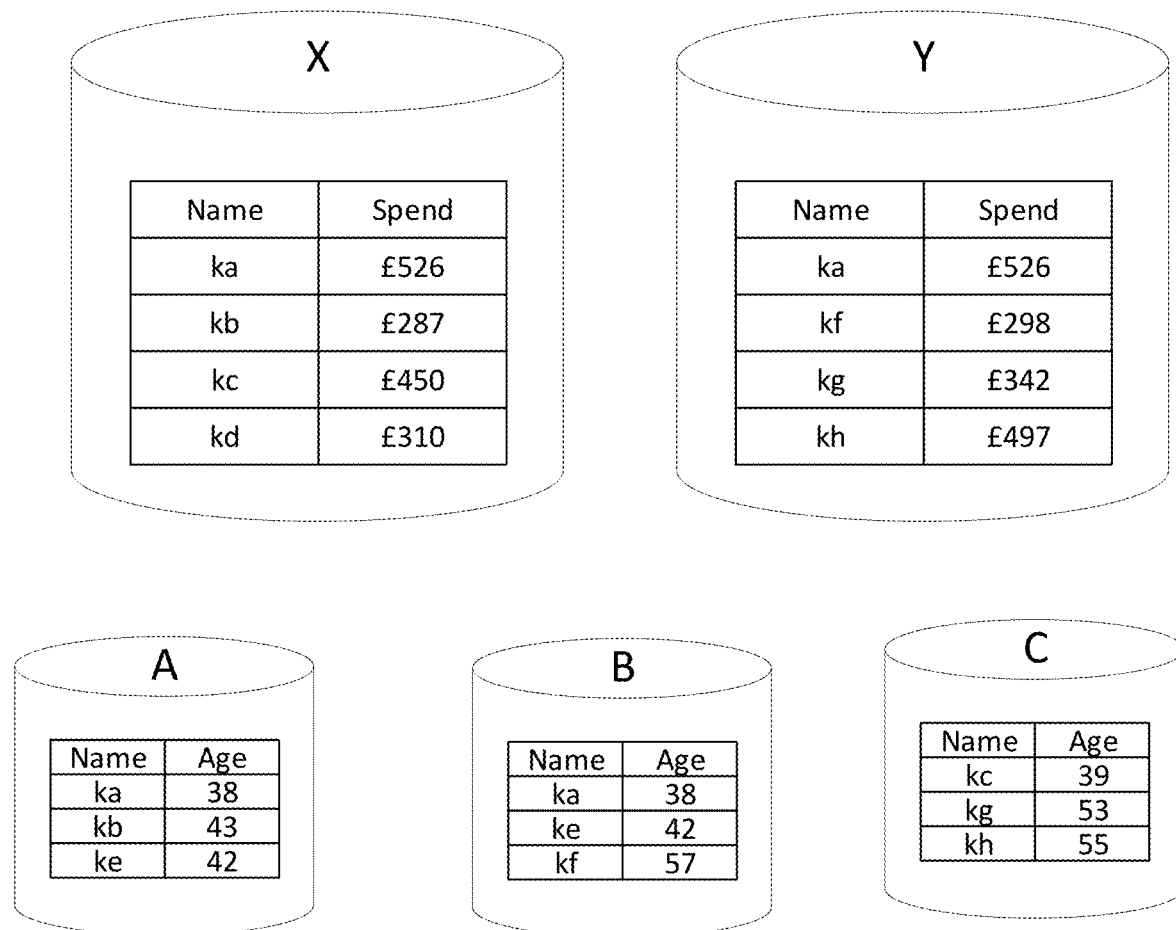
FIG. 6 shows five example datasets.

With reference to FIG. 6, consider a first the situation of datasets overlapping with a single key.

As mentioned above, the algorithm may have at its disposal a variety of different datasets available to use. Only an exemplary small number of data entries are shown in FIG. 6 which are relevant for the discussion below; typically each datasets stores a great many more entries than shown in the figure.

For the purposes of explanation, the datasets are divided into two types: "audience" datasets, X and Y, and "supporting" datasets, A-C. However, it is understood that this is for the purposes of explanation only and that in general, each dataset may store any additional information allowing it to function as either an audience dataset or a supporting dataset. The roles of each type of dataset are explained below. A supporting dataset may be an enrichment data set or a via dataset.

The following applies to a query requiring filter data which is not present in the audience dataset.

Because the dataset the user intended to capture data from (the audience) is known, it is possible to determine a measure of the quality of the returned result.

For example, where a query specifies "age<40" but the audience dataset does not hold age data for some or all of the data entries, one or more enrichment datasets can be used to provide this information. The quality of the returned result (in this example) depends on for how many data entries it was possible to determine an age, and therefore apply the filter.

Any dataset which holds associations between names and ages could be used as an enrichment dataset for this task. Any other datasets which are available but which do not contain age information may be disregarded.

Figure 7A:
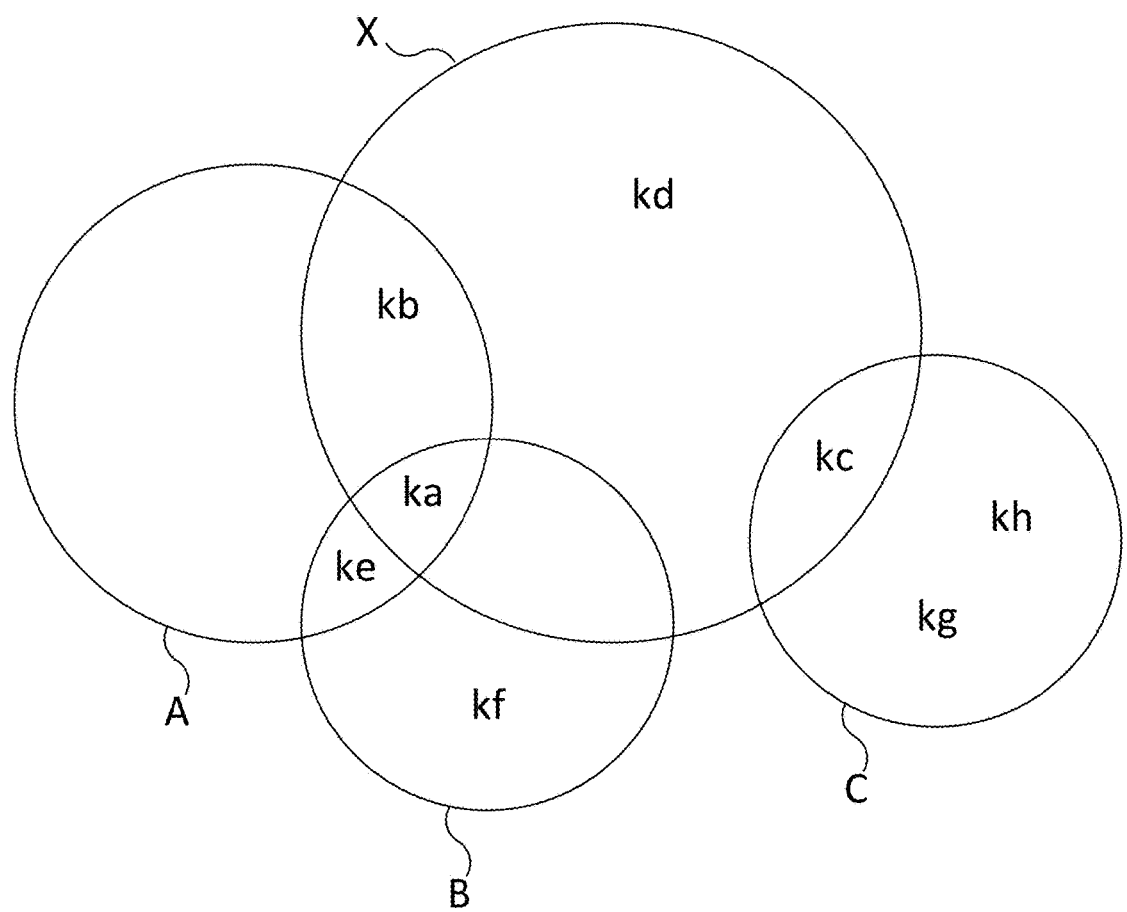
FIG. 7a illustrates the key relationship between the datasets using a first audience dataset.

The overlap between data in the audience dataset X and the enrichment datasets A-C may be represented in an Euler diagram, in which case:

Enrichment using A allows ka and kb to be analysed.
Enrichment using B allows ka to be analysed.
Enrichment using C allows kc to be analysed.
No dataset holds age information for kd.
This is illustrated in FIG. 7a.

Figure 8A:
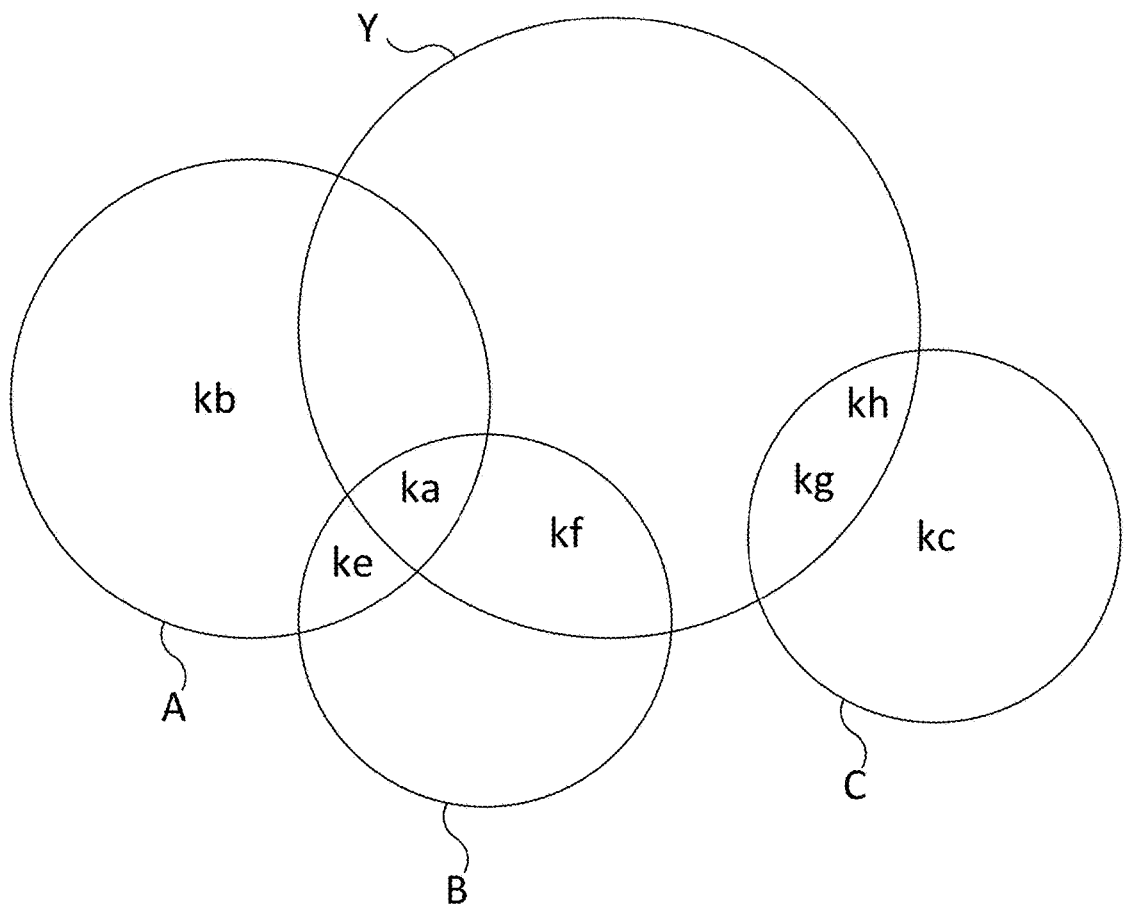
FIG. 8a illustrates the key relationship between the datasets using a second audience dataset.

Similarly, the overlap between data in the audience dataset Y and the enrichment datasets A-C may be represented in an Euler diagram, in which case:

Enrichment using A allows ka to be analysed.
Enrichment using B allows ka and kf to be analysed.
Enrichment using C allows kg and kh to be analysed.
This is illustrated in FIG. 8a.

It is therefore appreciated that the set of entries which can be analysed depends on the choice of key. Hence, it is understood that the usefulness of a given enrichment dataset will likely vary depending on the key used. It can therefore be beneficial to use more than one key because there may be entries which can be analysed using one key and not another, and vice-versa. This is explained below with reference to FIGS. 12a and 12b.

Figure 7B:
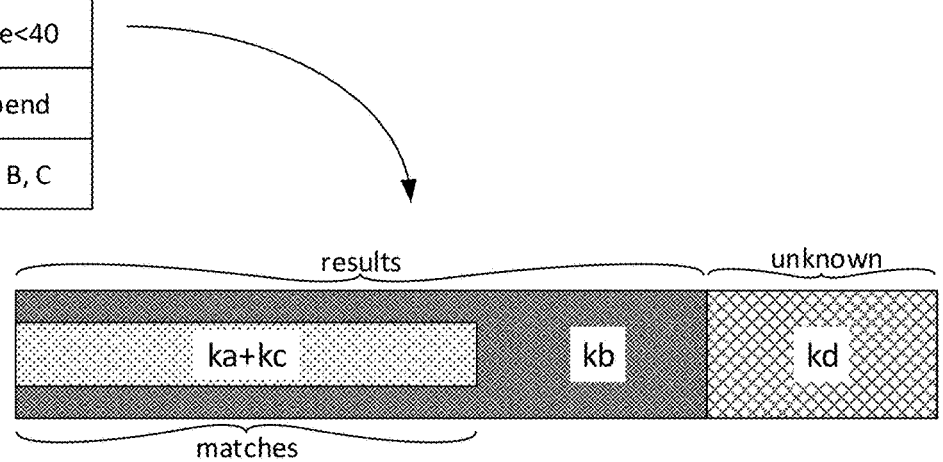
FIG. 7b illustrates an example query and example results when using the first audience dataset.

With reference to FIG. 7b, in an example, a user wishes to know the spending habits of people from dataset X who are younger than 40. However, dataset X does not hold age information.

The query specifies X as the audience, a filter of "age<40", "spend" as the category of data to be returned, and a bin size of £50, and one or more datasets to use as supporting datasets.

Because X is the audience, the best option is to use A and C as the supporting datasets. This is because B does not provide any additional information, given that the overlap between B and X (ka) is already accounted for in the overlap between A and X.

In this example, only 75% of the audience data is represented in the results (ka, kb, kc). This is because it was not possible to determine the age of kd, and therefore not possible to apply the filter (age<40) to this data entry. The quality score for this may be indicated to the user as 75%.

The algorithm could use one or both datasets. If the data is consistent, both may be used.

Note that the quality relates to the number of entries to which the filter could be applied, not the number of entries which satisfy the filter. Indeed, using X as the audience resulted in more matches (two, ka and kc) than using Y as the audience, despite the quality being lower.

With some techniques it would be possible to evaluate each additional enrichment dataset based on the incremental benefit provided by it. E.g. once a set of rows has been enriched they can be separated out from the remainder of the audience and the process can continue further with the remaining data.

Figure 8B:
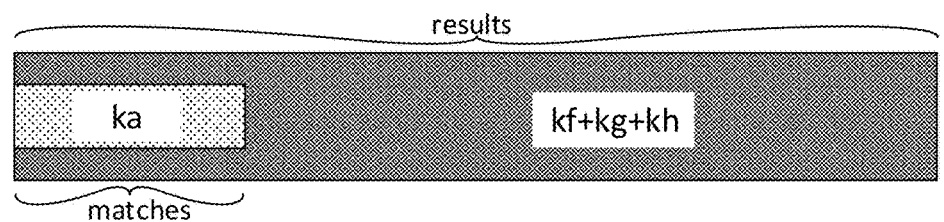
FIG. 8b illustrates an example query and example results when using the second audience dataset.

With reference to FIG. 8*b*, in another example, a user wishes to know the spending habits of people from dataset Y who are younger than 40. In this case the best option is to use B and C as the supporting datasets. This is because A does not provide any additional information, given that the overlap between A and X (ka) is already accounted for in the overlap between B and X.

In this example, 100% of the audience data is represented in the results (ka, kf, kg, kh). The quality score for this may be indicated to the user as 100%.

As is clear from the examples given above, the choice of supporting datasets is dynamic at run time. That is, it depends on the choice of audience dataset.

Figure 9:
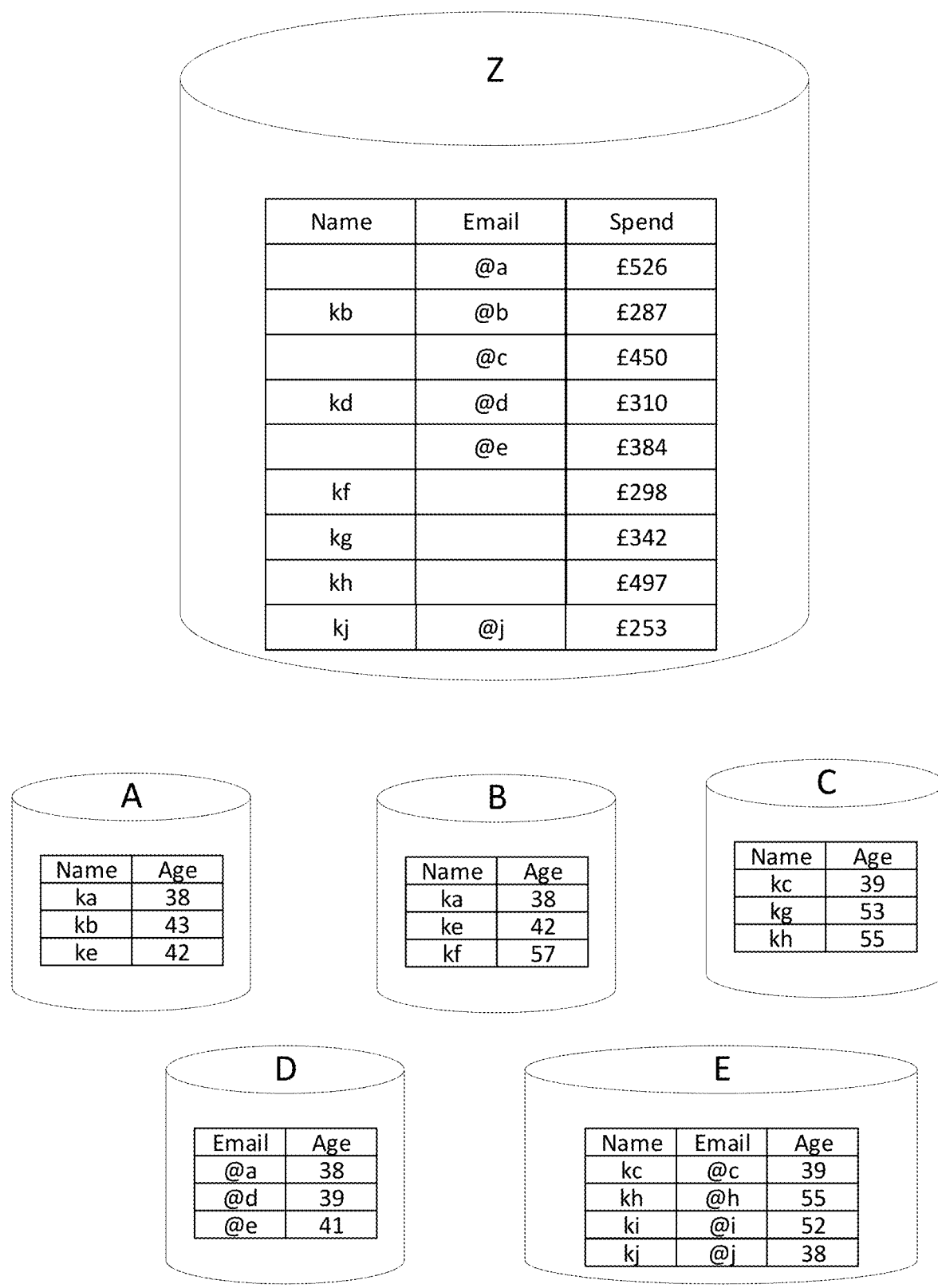
FIG. 9 shows six example datasets.

This is in contrast to a "data lake" which simply generates supersets of data and then runs any incoming query on the super set.

Where there is more than one key, a choice may need to be made. FIG. 9 shows an example in which data entries can be identified by more than one key. The audience is dataset Z which stores data (spend) identified by one or more keys, name and/or email address.

In this example, there are five supporting databases available A-E. Each stores age values identified by a respective key or keys.

As in the earlier, simpler example, the overlap between each of the supporting datasets and the audience can be represented as an Euler diagram. However, in this case the overlap depends on the choice of key.

Figure 10:
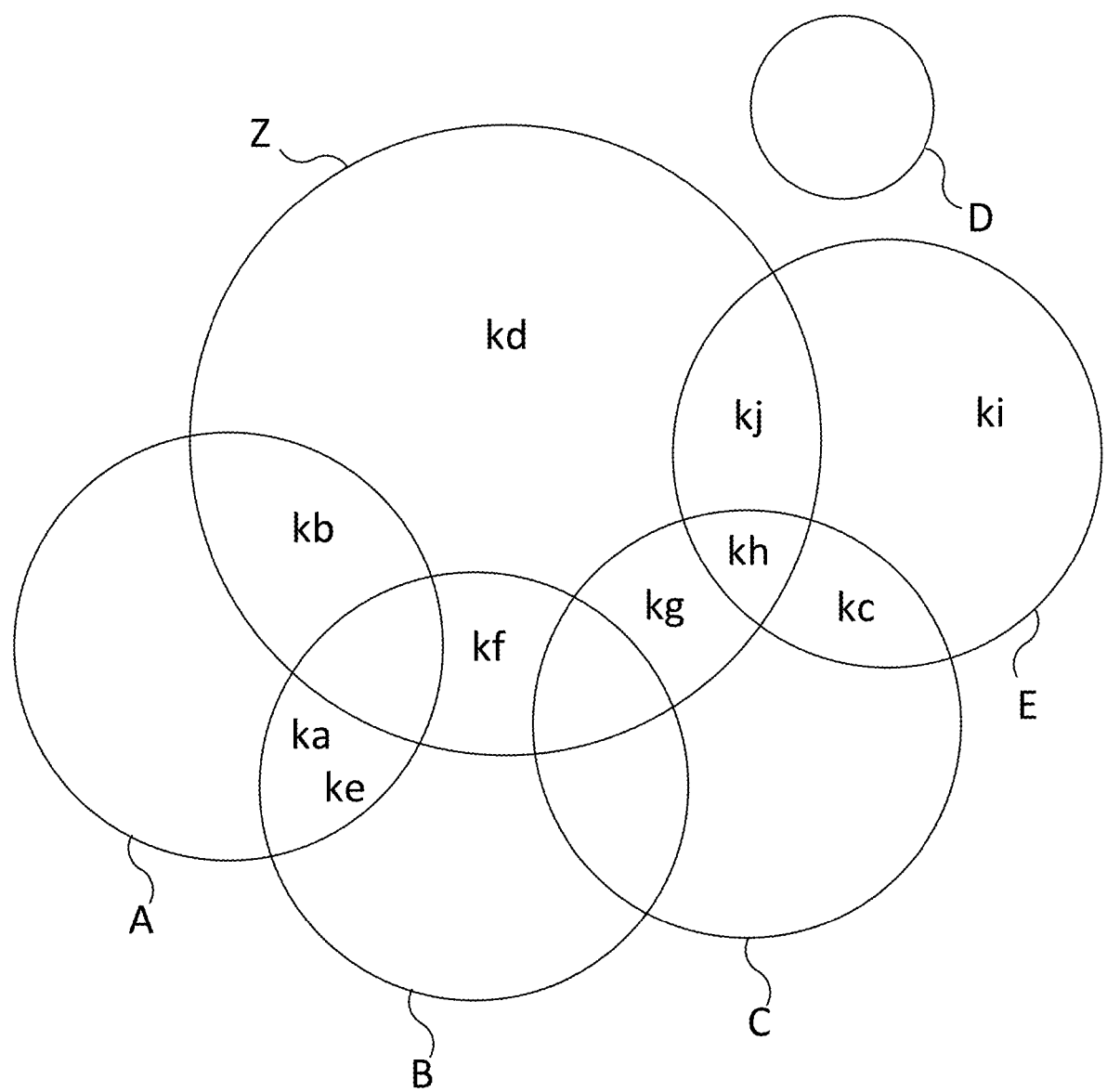
FIG. 10 shows the relationship between the six example datasets using a first key.

FIG. 10 illustrates the overlap between the datasets when considering the name key.

Figure 11:
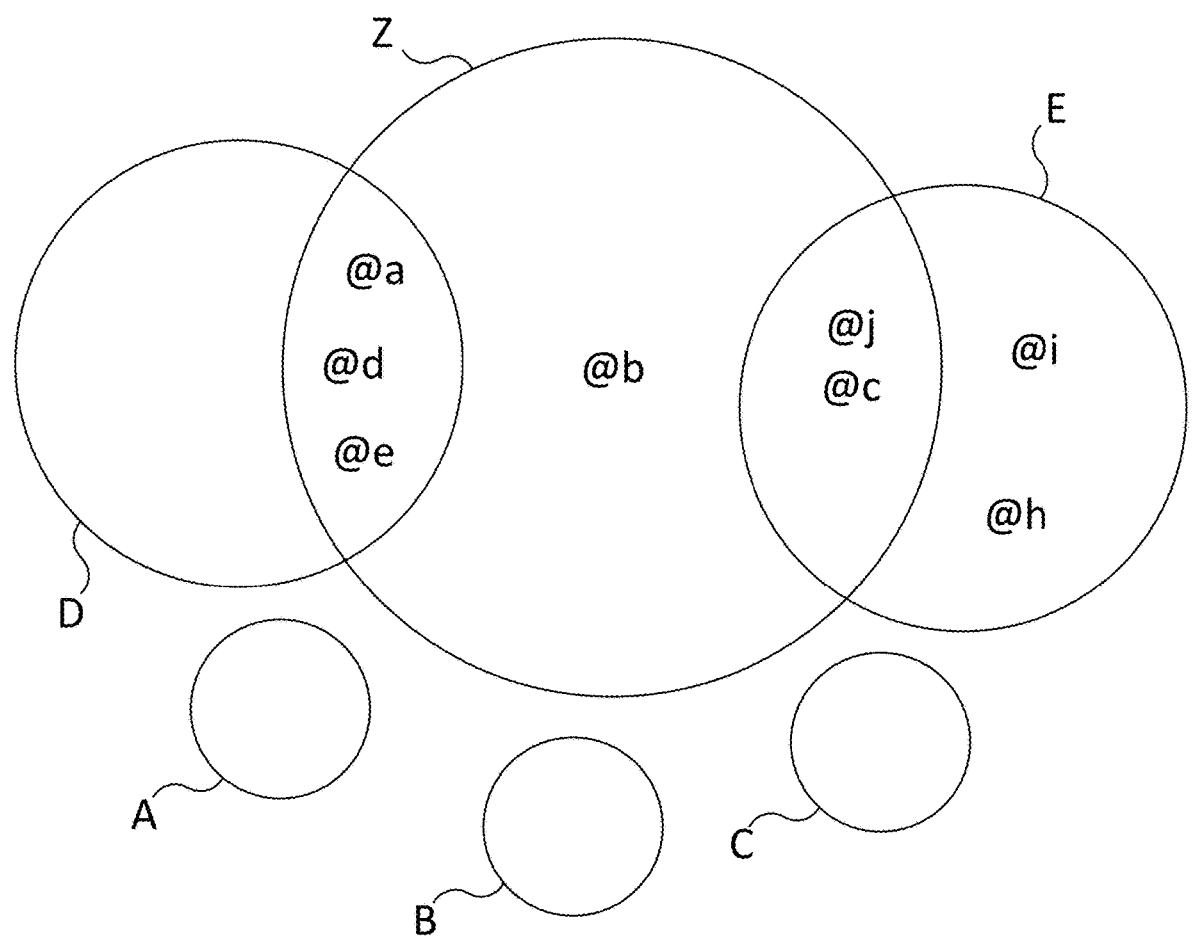
FIG. 11 shows the relationship between the six example datasets using a second key.

FIG. 11 illustrates the overlap between the datasets when considering the email key.

What this means is that the usefulness of a given supporting dataset will likely vary depending on the key used.

Figure 12A:
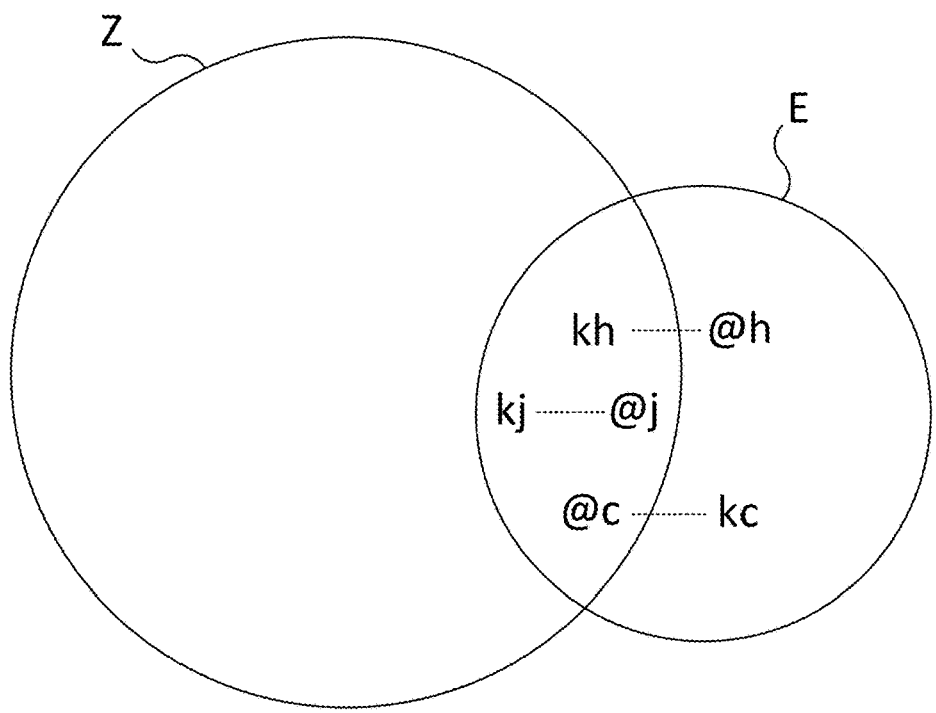
FIG. 12a illustrates overlap between an audience dataset and an enrichment dataset.
Figure 12B:
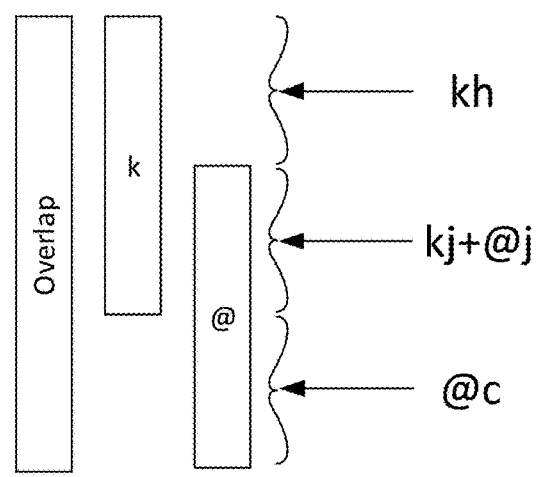
FIG. 12b illustrates how the total overlap can be broken into sub-overlap components.

Take the intersection between Z an E as an example. This is illustrated in FIGS. 12*a* and 12*b*.

In this case, supporting dataset E can help identify the ages of entries h, j and c. However, only h and j can be identified using the "name" key, and only j and c can be identified using the "email" key.

In general, similar considerations will apply with respect to each of the other supporting datasets. Therefore, the present algorithm may determine a respective intersection between the audience and each of the supporting datasets using each respective combination of keys available. These "partial" intersections can then be used to construct any desired intersection.

Note that it may be important to quantify how independent the key set are and how best to combine them. A lack of independence of the key sets can lead to under or over counting when combining the results.

Figure 9A:
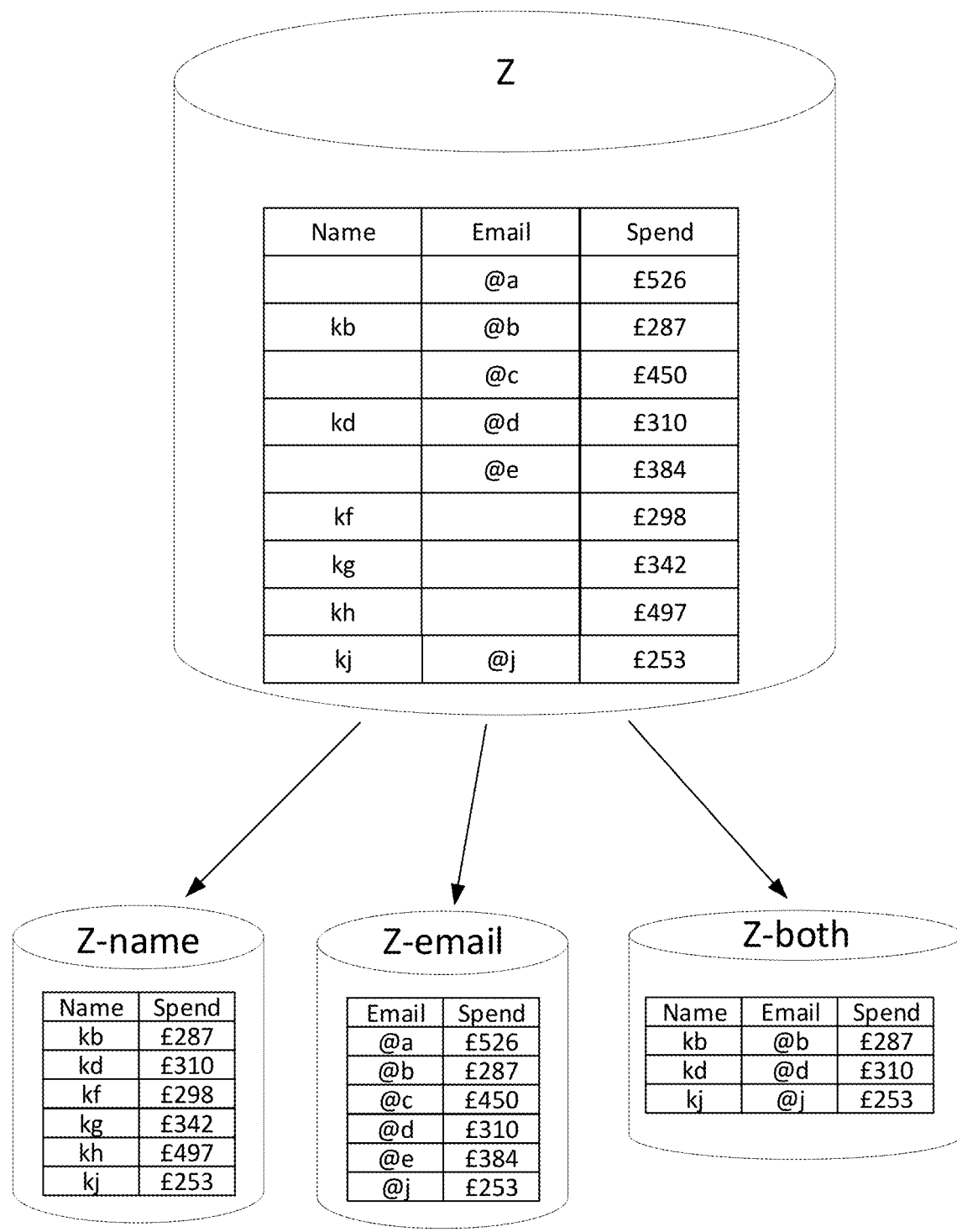
FIG. 9a illustrates how a dataset can be broken down into sub-datasets.

FIG. 9*a* illustrates the fact that a dataset comprising more than one key attribute can be broken down into several single-key attribute datasets. Dataset Z is taken as an example, as it contains both name and email key data. From dataset Z, three new datasets can be formed:

dataset Z-name comprising those entries from dataset Z which has a name key only (not an email key);

dataset Z-email comprising those entries from dataset Z which has an email key only (not a name key); and dataset Z-both comprising those entries from dataset Z which have both a name key and an email key These new "child" datasets can be used separately. For example, consider enrichment of audience Z with enrichment dataset E. As illustrated in FIG. 12*a*, entry "h" can only be analysed using the name key ("kh"), entry "j" can be analysed with either of the name key ("kj") or email key ("@j"), and entry "c" can only be analysed with the email key ("@c").

Therefore, as shown in FIG. 12*b*, the total overlap between Z and E may be broken down into two sub-overlaps, one for each key. The name sub-overlap can be analysed using dataset Z-name described earlier and the email sub-overlap can be analysed using dataset Z-email described earlier.

Another issue that arises with multiple keys (and single keys) is consistency across the datasets. One solution is to use user input to prefer one or more datasets for a particular attribute that they have high confidence in.

The distribution of data within a particular dataset (both the audience and the enrichment datasets?) may not be flat over a particular key. That is, the data may be weighted towards different respective value(s) when considering different respective keys.

For example, younger people may be more likely to be identified by their email address, whereas older people may be more likely to be identified by their physical address.

Figure 13:
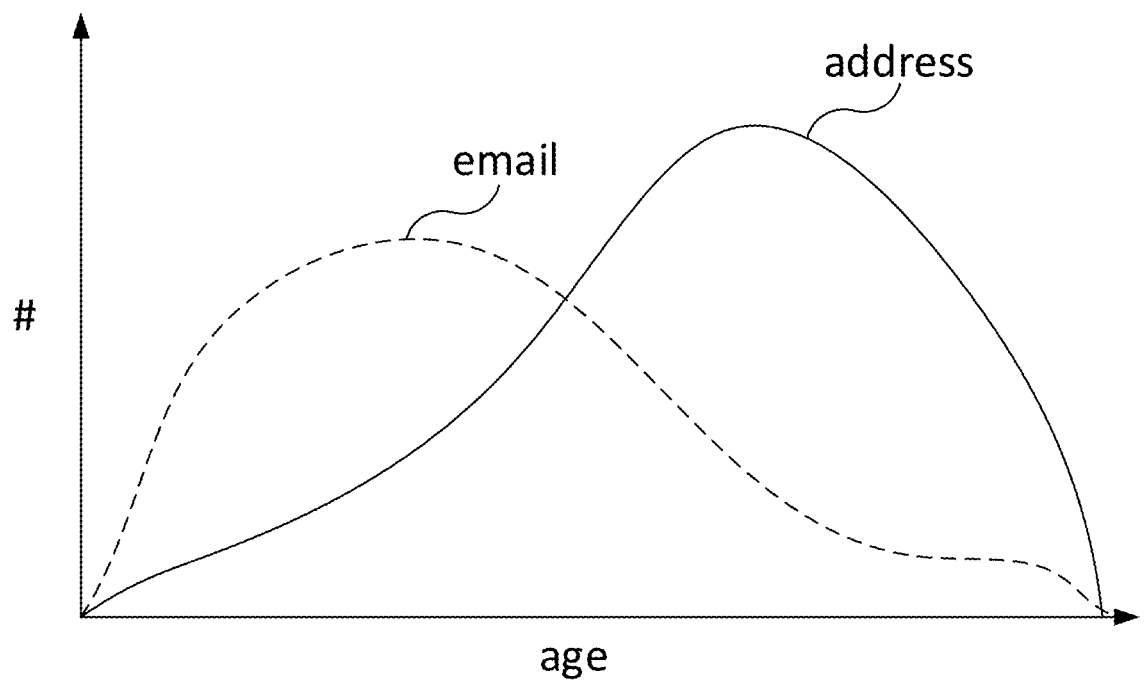
FIG. 13 illustrates an example of distribution skew.

An example distribution is illustrated in FIG. 13. This is termed "skew". It may also be ameliorated by user selection of datasets for particular attributes.

Figure 5:
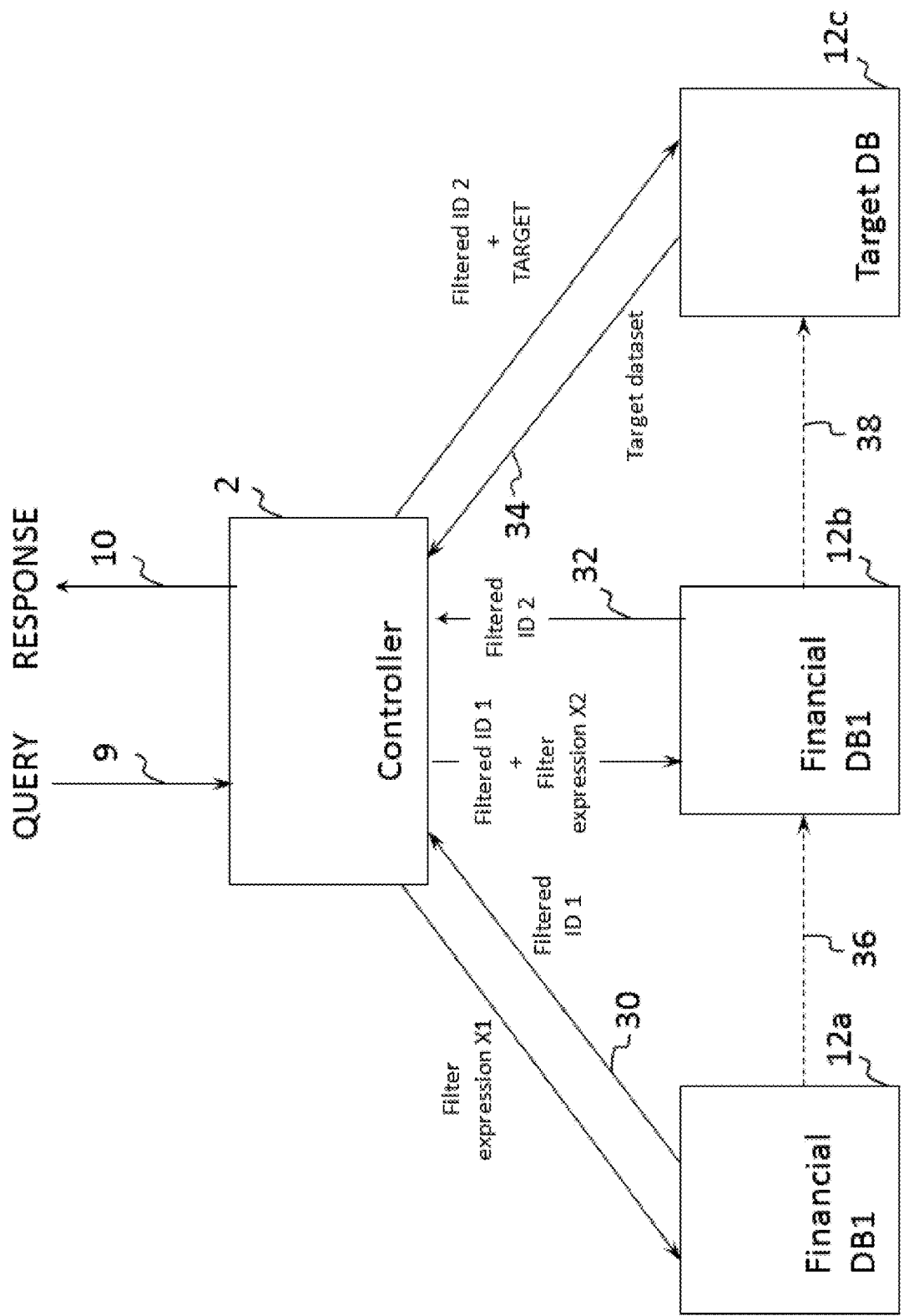
FIG. 5 is a schematic architectural diagram which gives one example of a join process.

FIG. 5 is a schematic architectural diagram which gives one example of a join process. Other implementations are possible. As shown in FIG. 5, a query 9 is received at the controller 2 from the UI 200. In this case, the controller 2 splits the query into three separate queries, a first query with a first filter expression X1, a second query with a second filter expression X2, and a third target query with a target (or aggregation) expression TARGET. As an example, the first filter expression could be an age range (e.g. between 18 and 25), the second filter expression could be income (e.g. more than £60,000) and the target expression could be gender (i.e. all females). The first query with the first filter expression X1 is sent to the first database 12*a* of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set 1 can comprise a list of hashed identifiers, where each identifies a data entry in the database, or can be a bloom filter or the like.

A bloom filter can be applied to test whether an element is a member of a set. It consists of a set of positions which can be set to '1' or '0' depending on whether the position is occupied. In the present context, the positions represent identifiers, and each identifier identifies one or more rows of the database. More specifically, a bloom filter tests whether an element is certainly not present and therefore remove the need to seek elements that don't exist in a set. A bloom filter query returns a result of either "possibly in set" or "definitely not in set". A bloom filter is particularly useful if the amount of source data would require an impractically large amount of memory if "conventional" error-free hashing techniques were applied. The filtered ID set 1 and the second query with the second filter expression X2 is then addressed to the second database 12b of another financial organisation labelled Financial DB2. This database has been identified by the controller as being a good database for extracting income-related data. Note that alternatively the second database 12b could be useful for enticing the age attribute as described earlier.

The query which is run over the second filter database is a query which matches the second filter expression X2 against only those database entries identified by the filtered ID set 1. This is therefore potentially a faster query to run and might reduce the amount of data to transfer. Moreover, note that there has been no requirement to "Join" the records of the first and second filter databases into a common dataset. Thus, these databases can be completely independent, logically and/or geographically and do not have to have any common control or ownership. Note also that no raw data (database records) is transferred A second filter ID set 2, 32, is returned to the controller 2 following the query which is run on the second filtering database Financial DB2 12b. The controller 2 sends the second filter ID set 2 and the target expression to a target database which it has identified. The result 34 of running the target expression TARGET against the identifiers in the filter dataset 2 (or the bloom filter) is returned to the controller 2. The controller 2 provides the response 10 to the user, which is either raw data or aggregated data as discussed herein. Note in this context that the audience is defined as the single database 12c. However, a similar process could be carried out if, for example, the audience was defined as 12b INTERSECT 12c but in this case 12b would be subject to the target expression and not the filtering expression.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 5.

Because the audience can be defined using set operations, the audience is not (necessarily) a single dataset. This means that the audience (unless it is in fact a single dataset) can be split into partitions. The query can then be planned and executed independently and in parallel on each of the partitions. Advantages of this include improved efficiency and speed. Running the query on each partition can involve any of the techniques described herein (e.g. the use of enrichment and vias datasets). This will now be explained by way of example.

Consider a query of the form:
    SELECT Aggregate ((Age, 10, 20, 30), (Gender, "Male", "Female"))
    FROM (A Union B) Intersect C
    WHERE Income >2000 AND Location="London"
    ENRICH WITH D, E, F
    LINK WITH G, H
    Aggregation: Aggregated, multidimensional, privacy-controlled counts of distinct individuals. The aggregate result has a limited lifetime on the platform. A unique ID can be used to retrieve and inspect the result multiple times.

Audience: The audience defines the set of individuals that the query is "targeting". It is expressed using set operations (as described above). It represents the intent of the query.

Filter: Filters can be used to subset the audience based on a number of attributes (categories). Filters can be combined using Boolean logic operators.

Enrich With: Allows users to specify datasets from which additional properties can be used for filtering and aggregating but which does not change the audience or intent of the query. (i.e. one or more enrichment datasets).

Link With: Allows users to specify additional datasets in the event that the datasets used to build the audience do not share a common key (i.e. one or more via datasets).

Query execution goes through a number of stages which makes use of the information in the various parts of the query highlighted above. The audience may be broken down into a number of sub-components (partitions). As mentioned, the primary reason for this is efficiency. It can also support key selection optimisation (especially where key selection could involve multiple keys and also be different between different partitions).

In particular, the audience is broken down into Disjunctive Normal Form (each partition being disjunct from all other partitions). One way to do this is to assign each possible combination of audience datasets to a different partition. In the above example in which the audience is "(A Union B) Intersect C", there are five such partitions, each partition being a single disjunct. This is illustrated using a Venn diagram in FIG. 14a. The audience comprises the five disjuncts labelled 1 (C only), 3 (B and C only), 5 (A and C only), 6 (A and B only), and 7 (A B and C).

Once the audience is broken down into partitions, the query can be run over each partition separately due to the fact that the partitions are in Disjunctive Normal Form. any of the techniques described above (e.g. using one or more enrichment datasets, one or more via datasets, etc.) may be used when running the query over each partition, and these may also be assessed independently. For example, the enrichment dataset used for one partition may be different from the enrichment dataset used for another partition etc.

Figure 14A:
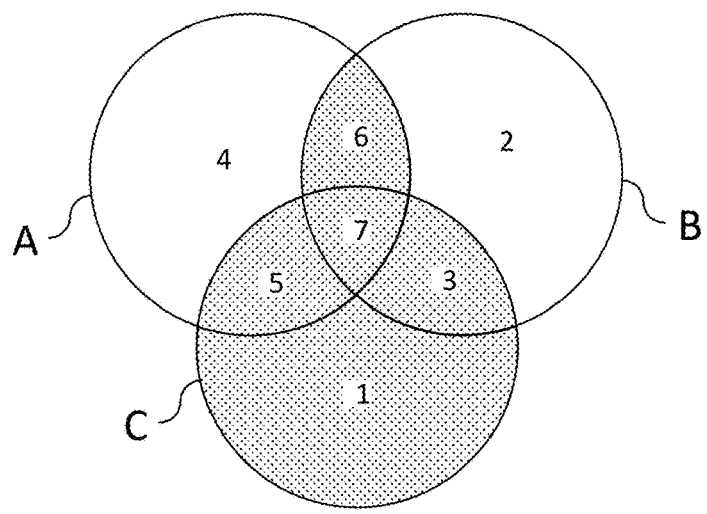
FIGS. 14a-c shows a Venn diagrams of an example audiences.

The disjuncts can be enumerated in a truth table, indicating, for each disjunct a) the datasets in which that disjunct is comprised, and b) whether or not that disjunct forms part of the audience. The truth table for FIG. 14a is shown below. Note that there is no need for a "disjunct 0" which would be outside of all datasets (as this will never be part of the audience, as it comprises no data entries). Hence, the number of disjunct is $2^n-1$ for n datasets. This is also equal to the worst-case scenario, i.e. the maximum number of disjuncts forming the audience, when the audience comprises a union of all the datasets (and must therefore comprise all the disjuncts).

TABLE 1

| Disjunct | A | B | C | Audience Member? |
|---|---|---|---|---|
| 1 | F | F | T | T |
| 2 | F | T | F | F |
| 3 | F | T | T | T |
| 4 | T | F | F | F |
| 5 | T | F | T | T |
| 6 | T | T | F | T |
| 7 | T | T | T | T |

Figure 14B:
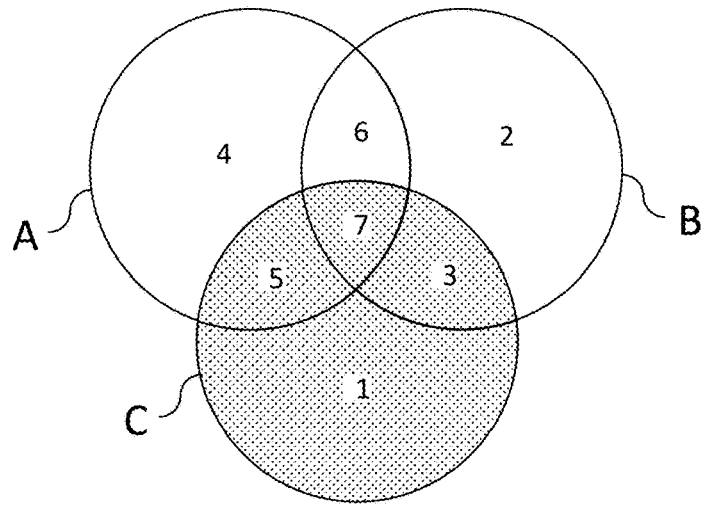

FIG. 14b shows a similar example in which the audience is instead defined as (A Intersect C) Union (B Intersect C) Union C. The audience comprises four disjunct: 1 (C only), 3 (B and C only), 5 (A and C only), and 7 (A B and C). The truth table for FIG. 14b is shown below.

TABLE 2

| Disjunct | A | B | C | Audience Member? |
|---|---|---|---|---|
| 1 | F | F | T | T |
| 2 | F | T | F | F |
| 3 | F | T | T | T |
| 4 | T | F | F | F |
| 5 | T | F | T | T |
| 6 | T | T | F | F |
| 7 | T | T | T | T |

Figure 14C:
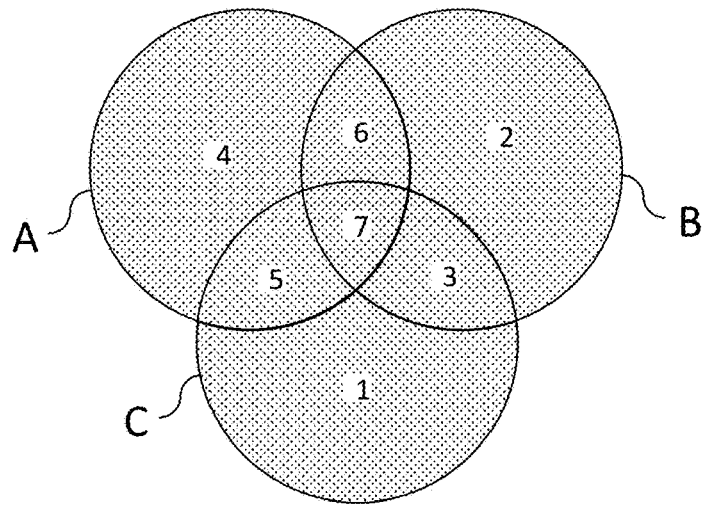

FIG. 14c shows another similar example in which the audience is instead defined as (A Union B Union C). The audience comprises seven disjunct: 1 (C only), 2 (B only), 3 (B and C only), 4 (A only), 5 (A and C only), 6 (A and B only), and 7 (A B and C). The truth table for FIG. 14c is shown below. Note that this is the worst-case scenario for n=3 datasets.

TABLE 3

| Disjunct | A | B | C | Audience Member? |
|---|---|---|---|---|
| 1 | F | F | T | T |
| 2 | F | T | F | T |
| 3 | F | T | T | T |
| 4 | T | F | F | T |
| 5 | T | F | T | T |
| 6 | T | T | F | T |
| 7 | T | T | T | T |

A more complicated example (not shown in the Figures) comprising four datasets A-D may have an audience defined as: (A/B) Union (C Intersect A/B) Union (C Intersect B/A) Union (D/B), where X/Y denotes the operation X Exclude Y. The truth table for this example is the following:

TABLE 4

| Disjunct | A | B | C | D | Audience Member? |
|---|---|---|---|---|---|
| 1 | F | F | F | T | T |
| 2 | F | F | T | F | F |
| 3 | F | F | T | T | T |
| 4 | F | T | F | F | F |
| 5 | F | T | F | T | F |
| 6 | F | T | T | F | T |
| 7 | F | T | T | T | T |
| 8 | T | F | F | F | T |
| 9 | T | F | F | T | T |
| 10 | T | F | T | F | T |
| 11 | T | F | T | T | T |
| 12 | T | T | F | F | F |
| 13 | T | T | F | T | F |
| 14 | T | T | T | F | F |
| 15 | T | T | T | T | F |

In this example there are eight disjuncts which are members of the audience (of the 15 possible disjuncts). Because the number of disjuncts (potential partitions) grows exponentially, in examples there may be a limit set for the number of datasets the user can include in the definition of the audience, e.g. 7 datasets restricts the maximum number of partitions to 127.

The examples given above all involve a naïve approach to partitions. That is, the audience is split into a set of partitions, each being a single disjunct. It is often possible, however, to achieve the same thing (same audience over which the query is run) using fewer partitions, each partition potentially comprising more than one disjunct. This reduces the number of times the query needs to be run and therefore improved the speed at which the query can be executed.

Figure 15:
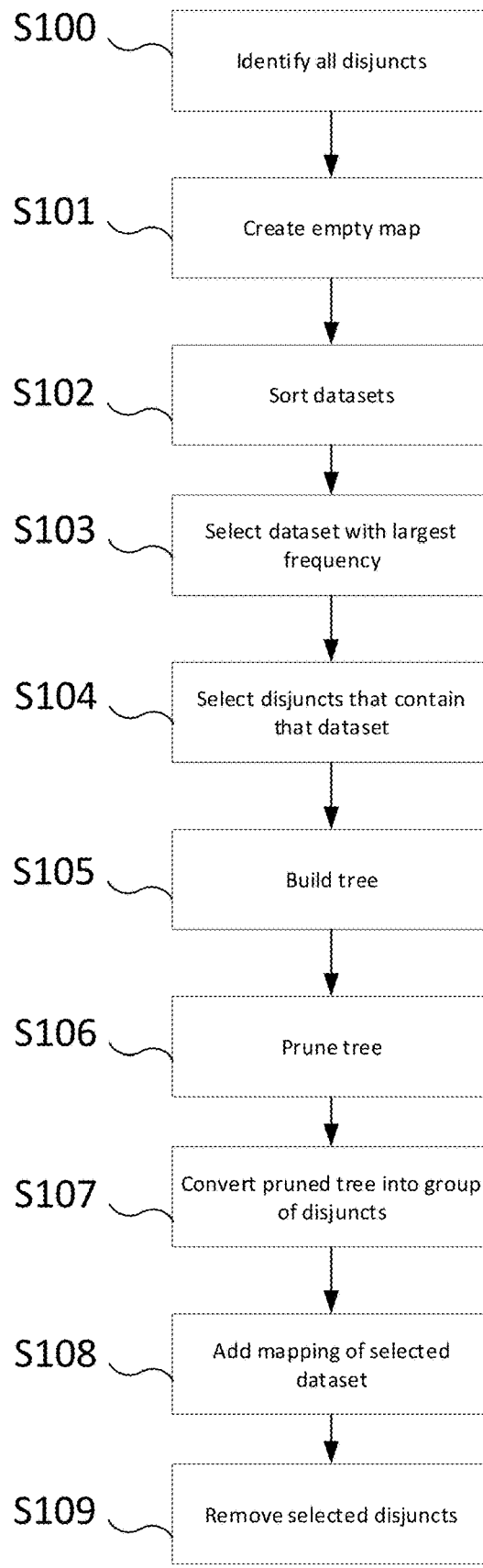
FIG. 15 shows schematically a flow diagram of an example method.

FIG. 15 is a flow diagram illustrating an example method for reducing the number of partitions. For the sake of explanation, the example from FIG. 14a and Table 1 will be considered first.

At S100, the relevant disjuncts (S) are identified. This comprises identifying all the individual disjuncts which form part of the audience. With respect to the truth table, this comprises removing any rows (disjuncts) for which the audience membership value is false. In this example, the following disjuncts remain:

TABLE 5

| Disjunct | A | B | C | Audience Member? |
|---|---|---|---|---|
| 1 | F | F | T | T |
| 3 | F | T | T | T |
| 5 | T | F | T | T |
| 6 | T | T | F | T |
| 7 | T | T | T | T |

At S101, an empty map (M) of Dataset (D) to Grouped disjunct (G) is created. *Ibis* Grouped disjuncts (G) will define the partitions over which the query is to be run, following the steps explained below.

At S102, the datasets are sorted by the frequency of T (true) in the truth table. That is, the datasets are sorted by the number of disjuncts (S) (i.e. discounting those which were removed at S100) which are part of that dataset. In this example, dataset A comprises three disjuncts (5, 6, 7), dataset B comprises three disjuncts (3, 6, 7) and dataset C comprises four disjuncts (1, 3, 5, 7). In this example, the datasets are ordered C, A, B, as shown in FIG. 6, although it is appreciated that in this example order C, B, A would be equally valid.

At S103, the dataset (D) with the largest frequency of True value in the truth table is selected. In this example, dataset C is selected.

At S104, the disjuncts (s) that contain the selected dataset are selected. This leaves a reduced table comprising disjuncts 1, 3, 5, 7 in this example, as shown in Table 6.

TABLE 6

| Disjunct | C | A | B | Audience Member? |
|---|---|---|---|---|
| 1 | T | F | F | T |
| 3 | T | F | T | T |
| 5 | T | T | F | T |
| 7 | T | T | T | T |

At S105, a tree of datasets is constructed representing all disjuncts selected in S104. Specifically, the tree is constructed using the datasets in order of decreasing frequency from S102. A branch is added to represent every combination of true/false present in the reduced table. FIG. 16a shows the tree in this example. In the tree, branches represent an intersection operation between the datasets on each vertex of the branch, and forks represent a union operation on the datasets defined by the subtree on each fork.

At S106, leaves from the tree are pruned/removed if both a negated and a non-negated version exist under the same parent. In this example, the pruning process is illustrated in FIGS. 16*a*-16*d*. In FIG. 16*a*, leaves B and notB exist under the same parent (notA) and so are removed. In FIG. 16*b*, leaves notB and B exist under the same parent (A) and so are removed. In FIG. 16*c*, leaves notA and A exist under the same parent (C) are so are removed. The pruned tree comprises only dataset C, as shown in FIG. 16*d*.

At S107, the pruned tree is converted into a group of disjuncts (G). This group of disjuncts (G) is one of the partitions which will be used for querying. In this example, the pruned tree defines a partition comprising all of dataset C.

At S108, a mapping of dataset (D) is added to Grouped disjuncts (G) in map (M), i.e. the pruned tree is added to the map (M) created at S101. That is, the dataset defined by the pruned tree (C in this example) is added to the set of partitions which will be used for querying.

At S109, the selected disjuncts from S104 are removed. The method then loops to S102 and repeats until all disjuncts are processed.

The second iteration is the same but applied to only those remaining disjuncts. In this example, the remaining disjuncts are:

TABLE 7

| Disjunct | A | B | C | Audience Member? |
|---|---|---|---|---|
| 6 | T | T | F | T |

Applying the steps defined above to this set of disjuncts results in a tree represented by A-B-notC. No pruning is possible because no branches exist which contain both a dataset and its negation.

In this example, the partition defined by the pruned tree is A Union B Union notC. This partition is added to the set S. There are no remaining disjuncts to consider once disjuncts 6 is removed, and therefore the method stops. There are two partitions in the set S which have been defined (C, A Union B Union notC) and cover the entire audience. This means that the query can be run on only two partitions, rather than on five as in the naïve approach described above. hence, query execution time is greatly improved.

Applying the algorithm described above in relation to the example of FIG. 14*b* results in a single partition equal to database C itself. Hence, the number of partitions is reduced from four (in the naïve approach) to just one.

Applying the algorithm described above in relation to the example of FIG. 14*c* results in three partitions: 1) A, 2) (B intersect notC intersect not A) union (B intersect C intersect notA), and 3) (C intersect notA intersect not B). Hence, the number of partitions is reduced from seven (the worst-case scenario) to three.

The first partition is created during the first pass of the method shown in FIG. 15 and described above. The second partition is created during the second pass, and the third partition is created during the third pass. In the third pass, for example, dataset C is the root of the tree so it is added as the key in the map, the value added to the map is C intersect 'A intersect'B because that is the disjunct representation of the tree (C-notA-notB).

In some examples, a user is able to promote their dataset within the platform. An example is shown in FIGS. 17*a-f*.

Figure 17A:
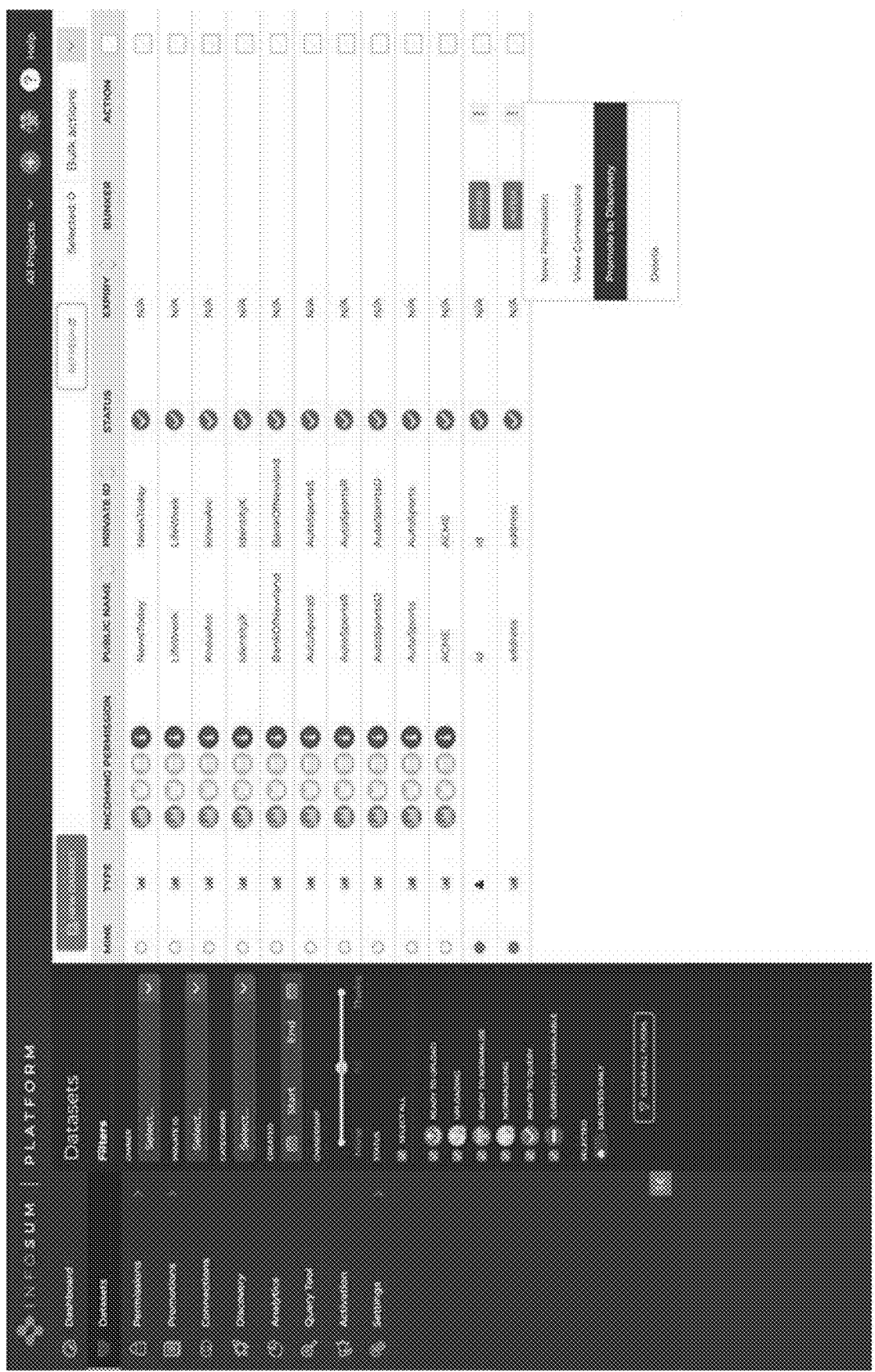
FIG. 17a-f show example user interfaces relating to promotion of datasets.

In FIG. 17*a*, the user has navigated to a "datasets" tab. The user is presented with a list of available datasets. The user is able to select one of his own datasets ("id") in this example to promote, e.g. via a drop-down menu brought up by right-clicking on the desired dataset.

Figure 17B:
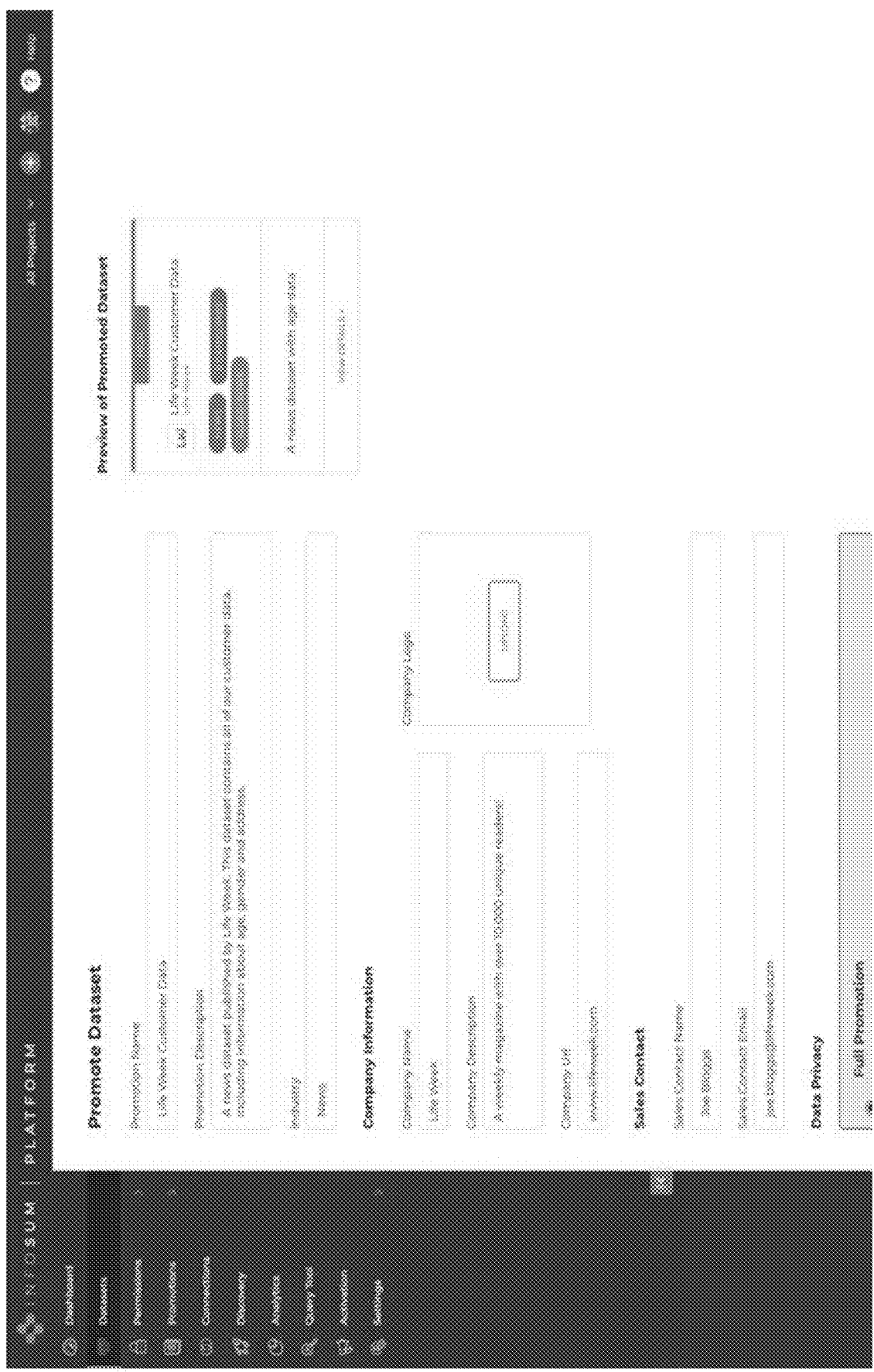
Figure 17C:
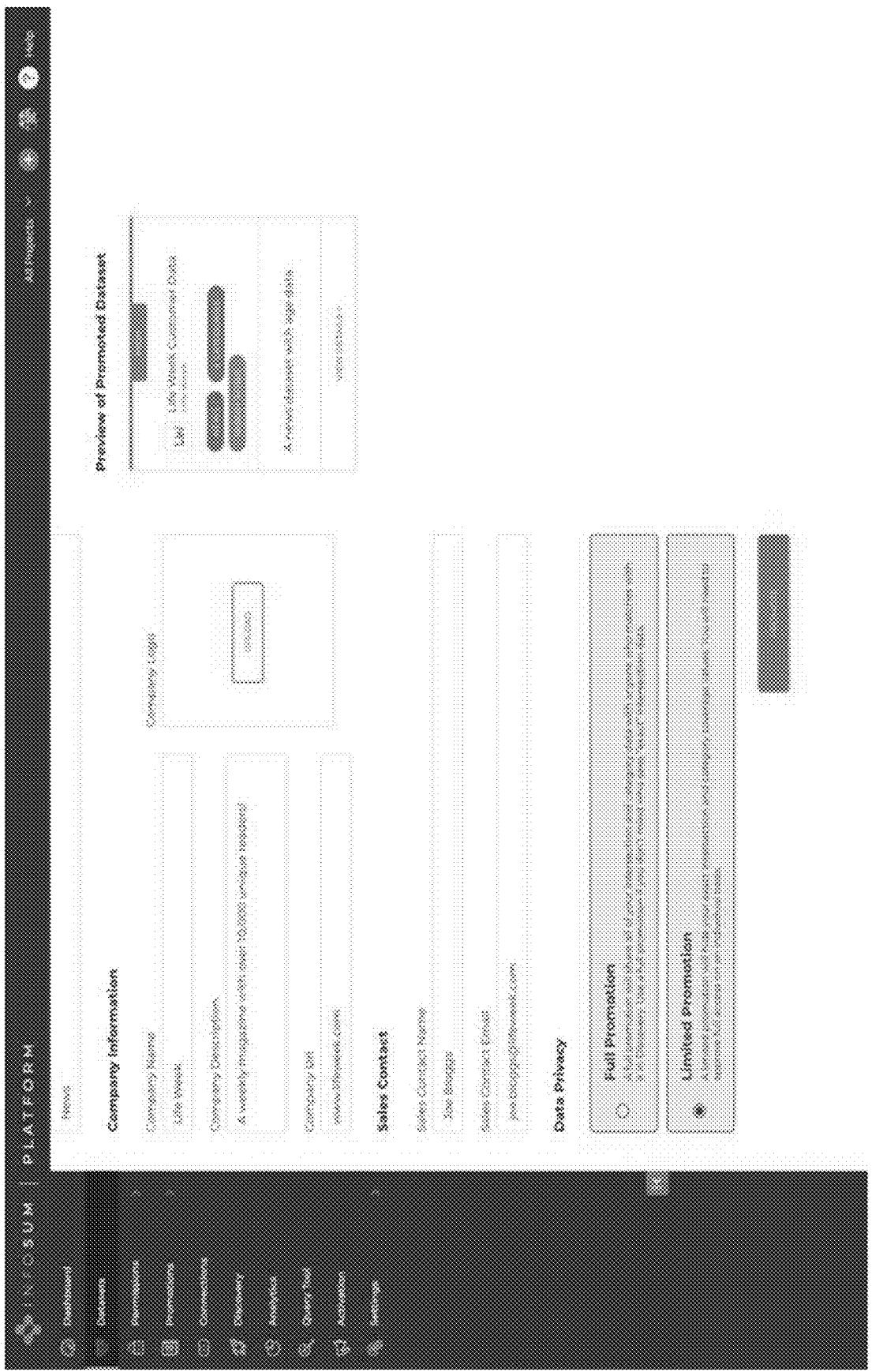

FIGS. 17*b* and 17*c* show different portions of a subsequent display once the user selected to promote a dataset. The user is able to configure various aspects of the promotion including, e.g. a promotion name ("Life Week Customer Data" in this example). The user may be provided with a preview of the promoted dataset.

Figure 17D:
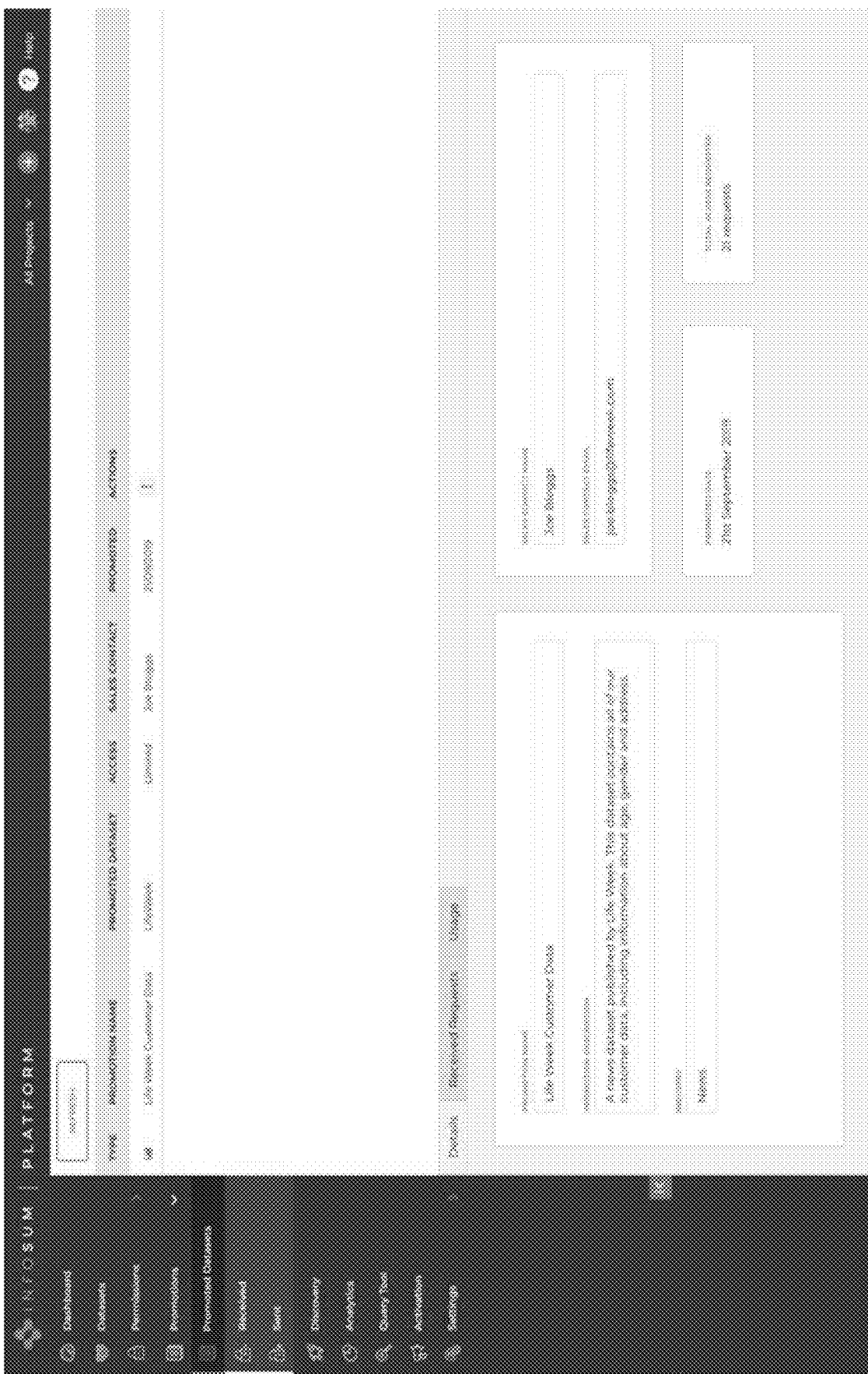

FIG. 17*d* shows a "promoted datasets" tab which navigates the user to a screen showing their currently promoted datasets. The promotion "Life Week Customer Data" discussed above is shown as an active promotion in FIG. 17*d*.

Figure 17E:
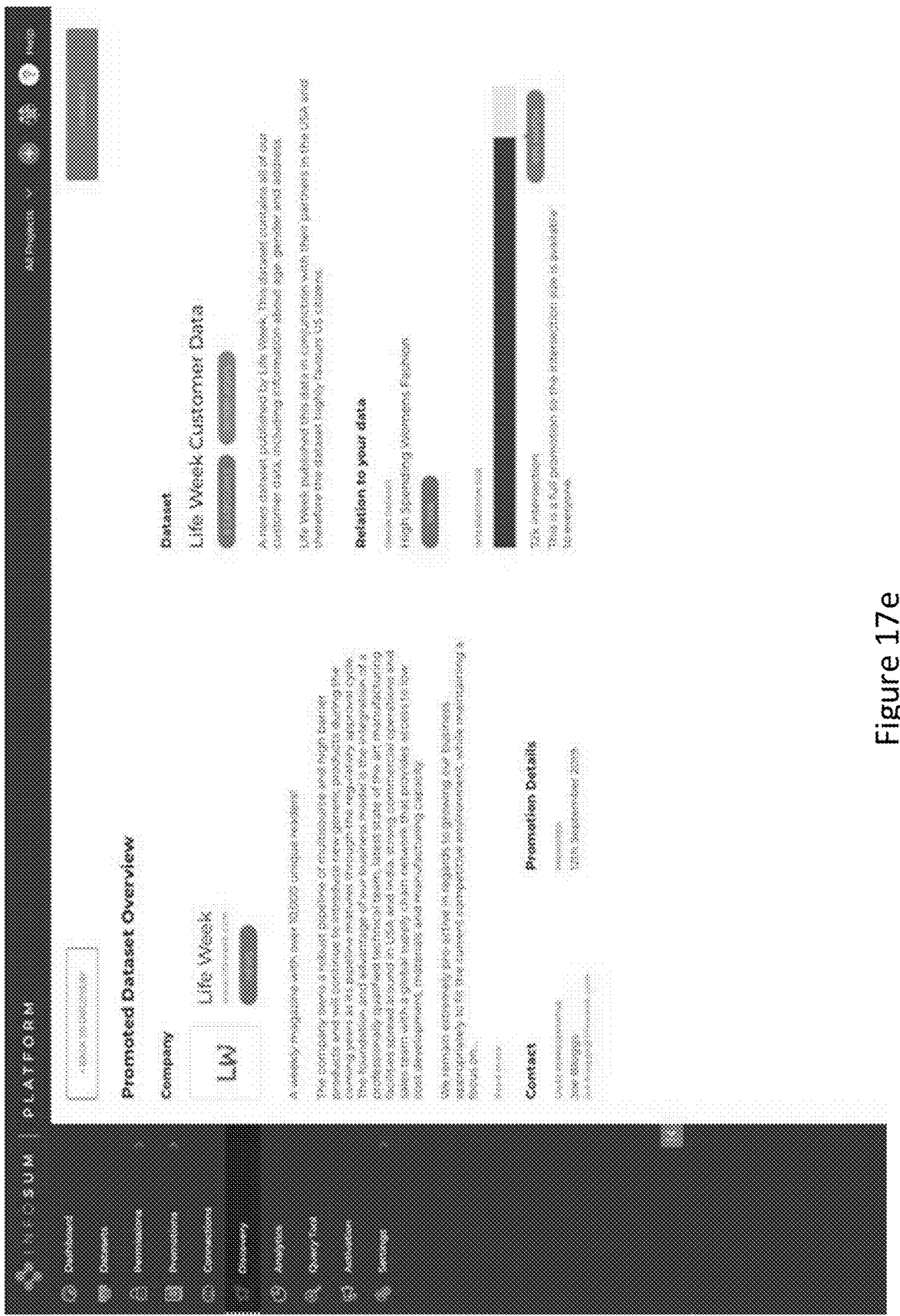
Figure 17F:
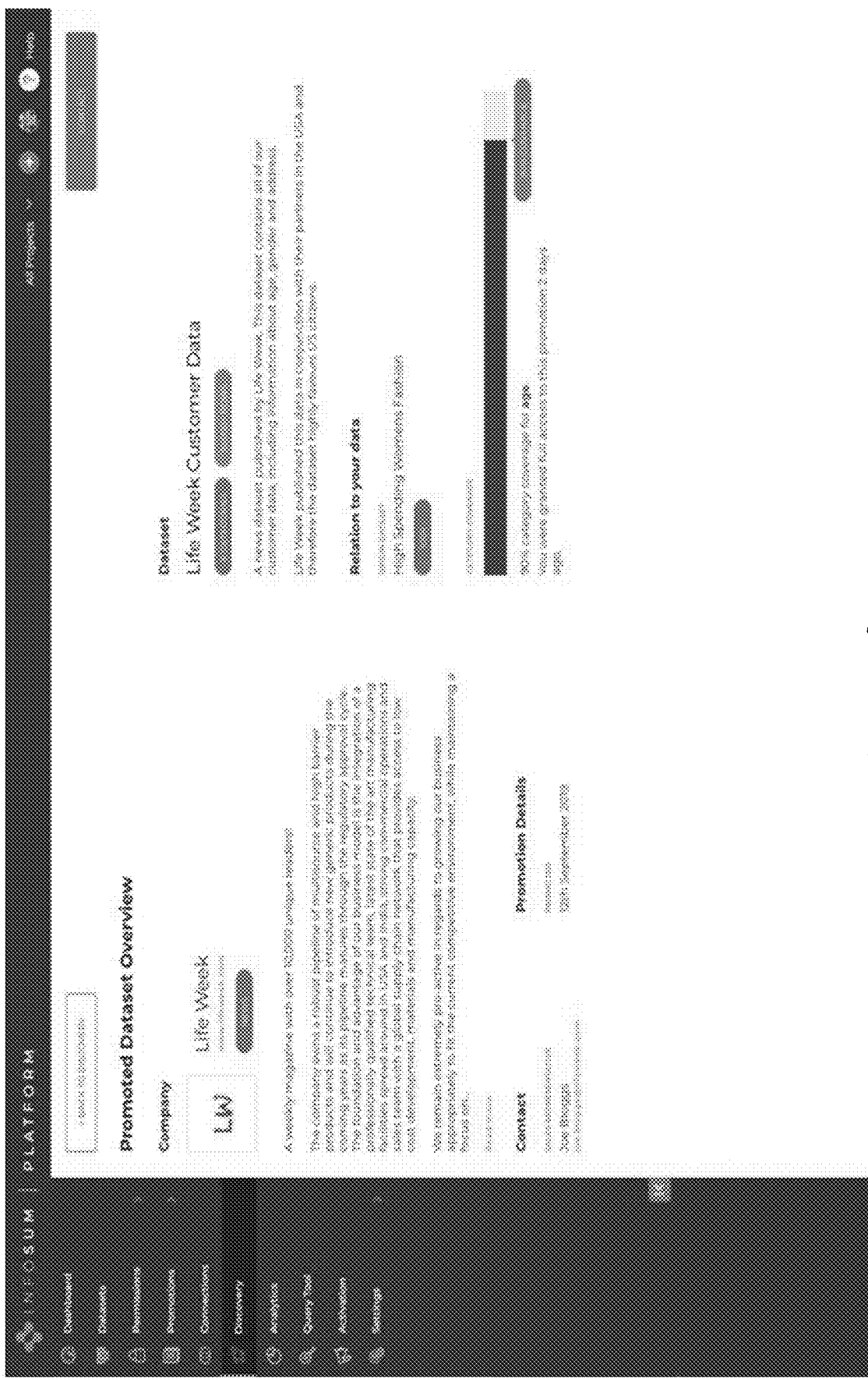

FIGS. 17*e* and 17*f* illustrate two different example user interfaces showing another user's view of a promoted dataset, i.e. viewed by a user who is not the one who promoted that promoted dataset. In FIG. 17*e*, the user is provided with an indication of the intersection of the promoted dataset with his own dataset (High Spend Women's Fashion). In this example, the indication is the number of common keys. In FIG. 17*f*, the indication is category-specific. That is, the user is provided with an indication of the coverage of their dataset by the promoted dataset for a specified category (age, in this example).

FIGS. 18*a-g* illustrate example user interfaces for the purposes of selecting an enrichment dataset.

Figure 18A:
FIGS. 18a-g show example user interfaces for the purposes of selecting an enrichment dataset.

FIG. 18*a* shows an example of an analytics screen, similar to FIGS. 4*a-c* above. In this case, the query is to aggregate over a) postcode bins, and b) age bins. There is postcode information available but no age information available in the audience ("High Spending Women's Fashion"). Hence, as shown in FIG. 18*a*, only the results for postcodes can be determined and displayed to the user. The corresponding portion of the analytics screen allocated for the age-related results displays an error message ("No Age data available"). The user then has the option to select one or more enrichment datasets to provide age data.

Figure 18B:
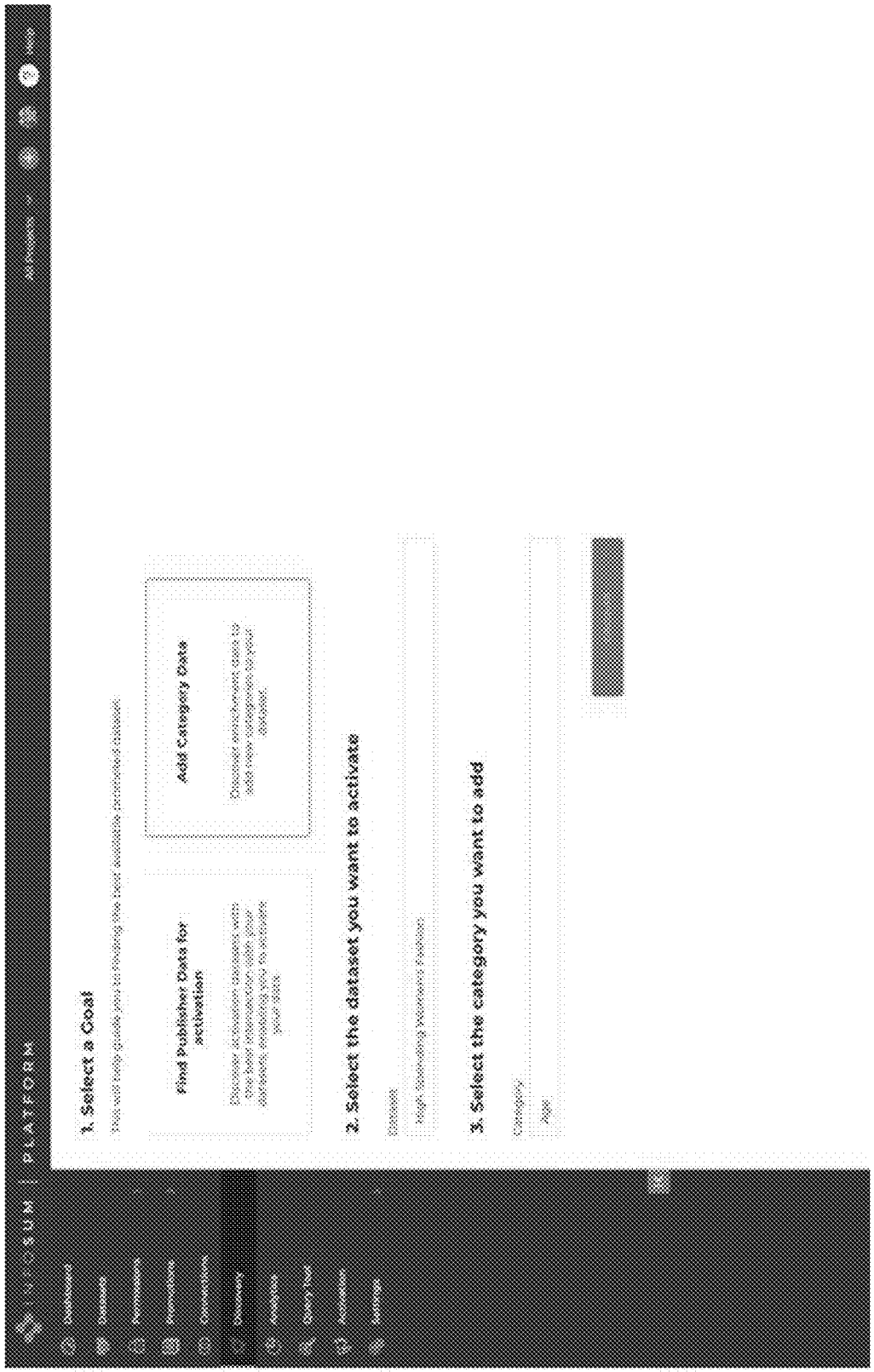

FIG. 18*b* shows a "discovery" tab on which the user is able to discover supporting datasets. In this example, the user has selected "add category data" as the aim (as category data, age, was missing in FIG. 18*a*). The user selects the dataset (audience) they which to active (High Spending Women's Fashion), and the category they wish to add (age). Once entered, the user is presented with a set of available enrichment datasets, as shown in FIG. 18*c*.

Figure 18C:
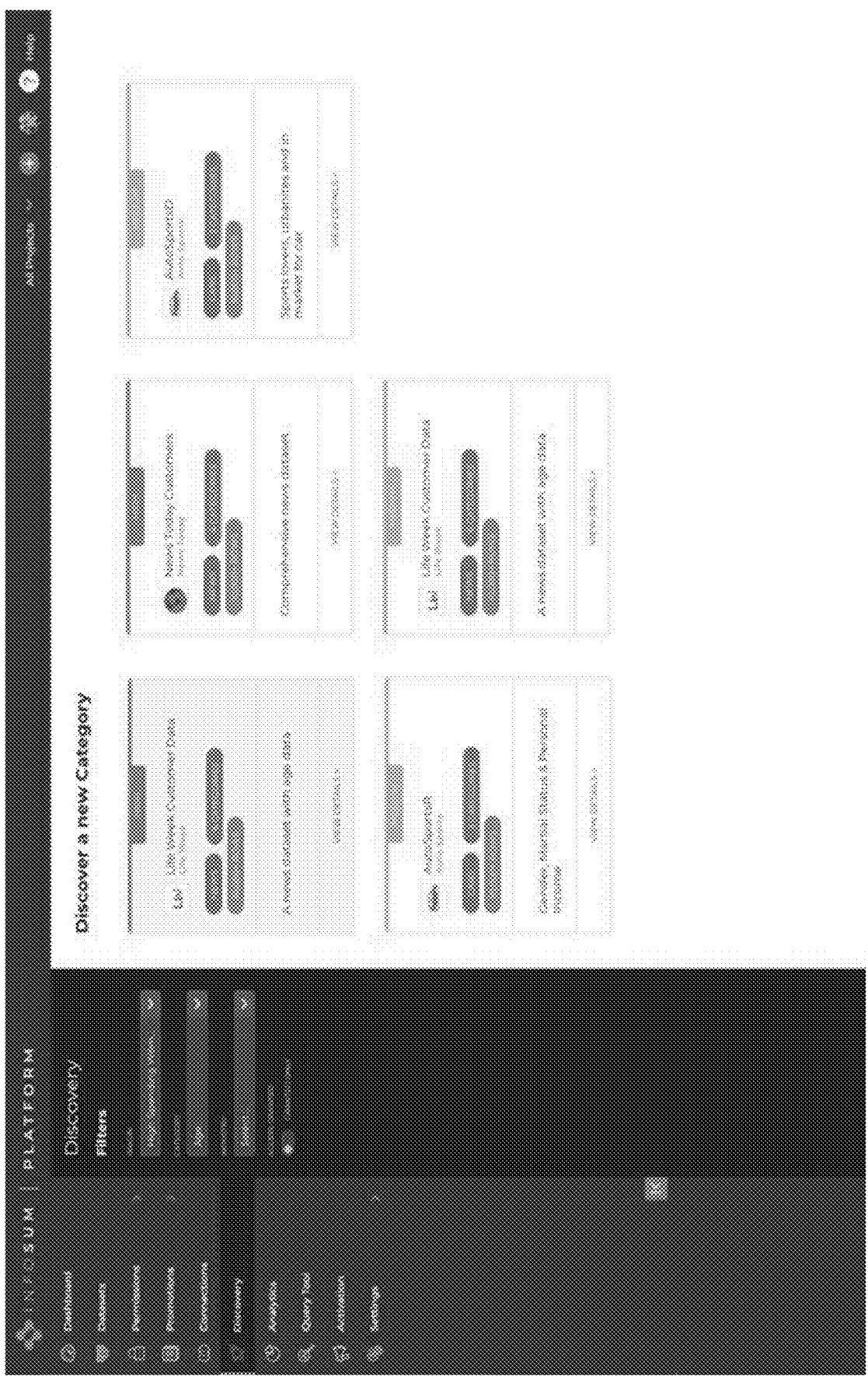

In this example, as shown in FIG. 18*c*, five illustrative enrichment datasets are shown as available. The user has selected "Life Week Customer Data" (e.g. the promoted dataset discussed above).

Figure 18D:
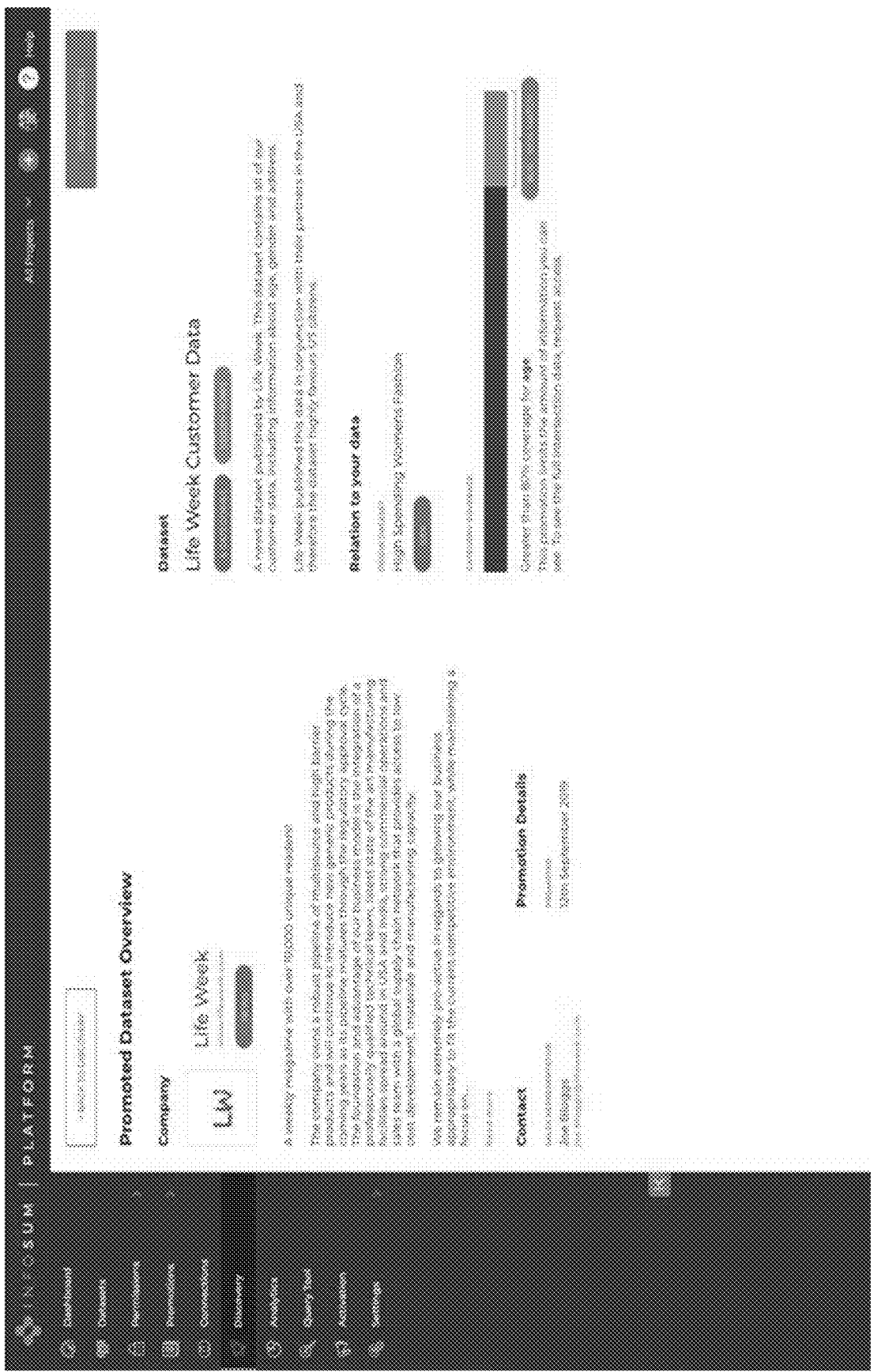

Once selected, the user is presented with a view such as shown in FIG. 18*d* which summarises the selected dataset ("Life Week Customer Data") and, crucially, provides an indication of the coverage that that dataset provides in relation to the selected category (age). In this example, the indication shows that Life Week Customer Data dataset provides a greater than 80% coverage for "age". Note that this does not mean that the user (yet) actually has access to the data in the selected dataset, only the indication may be provided.

Figure 18E:
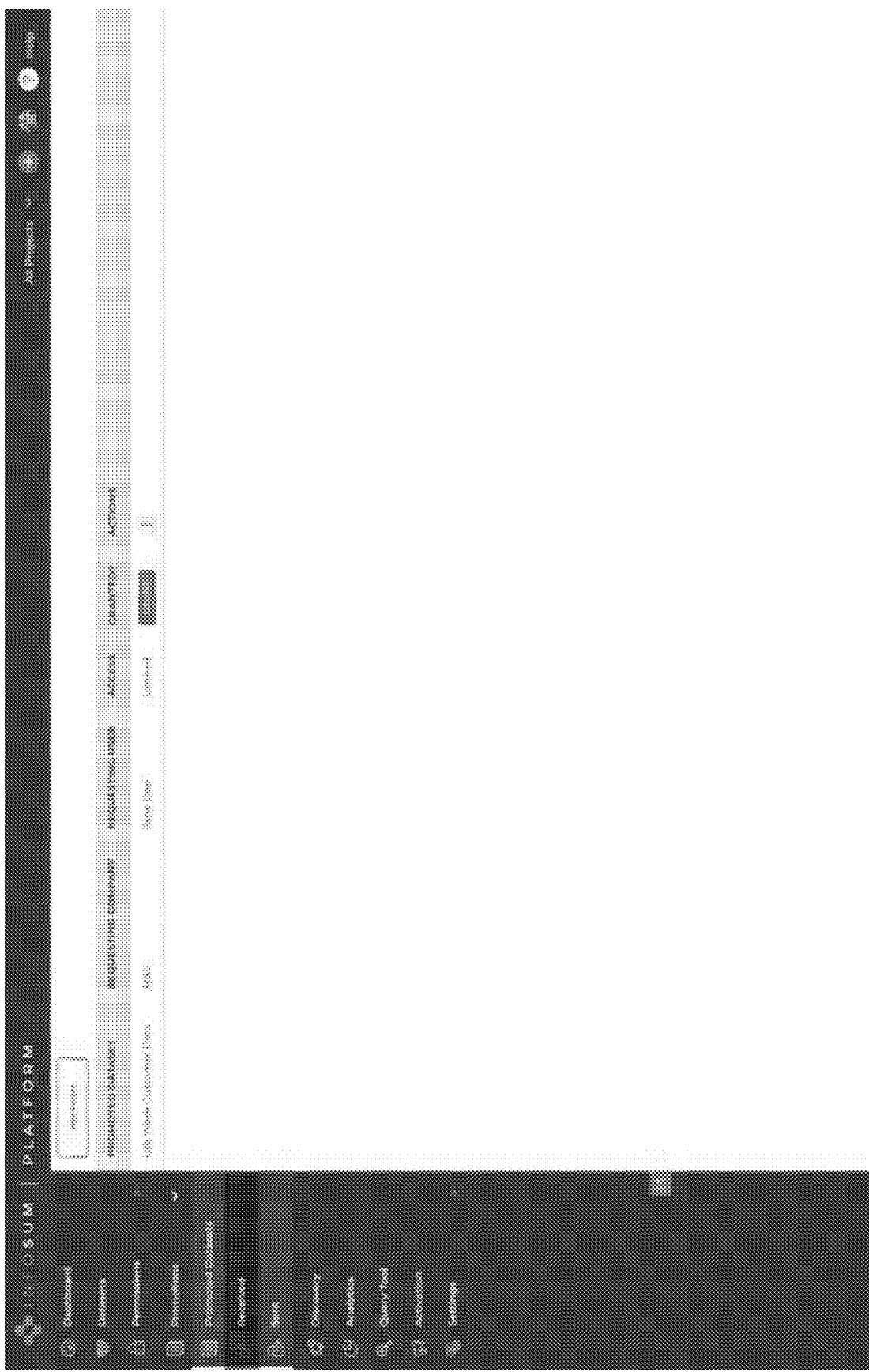
Figure 18F:
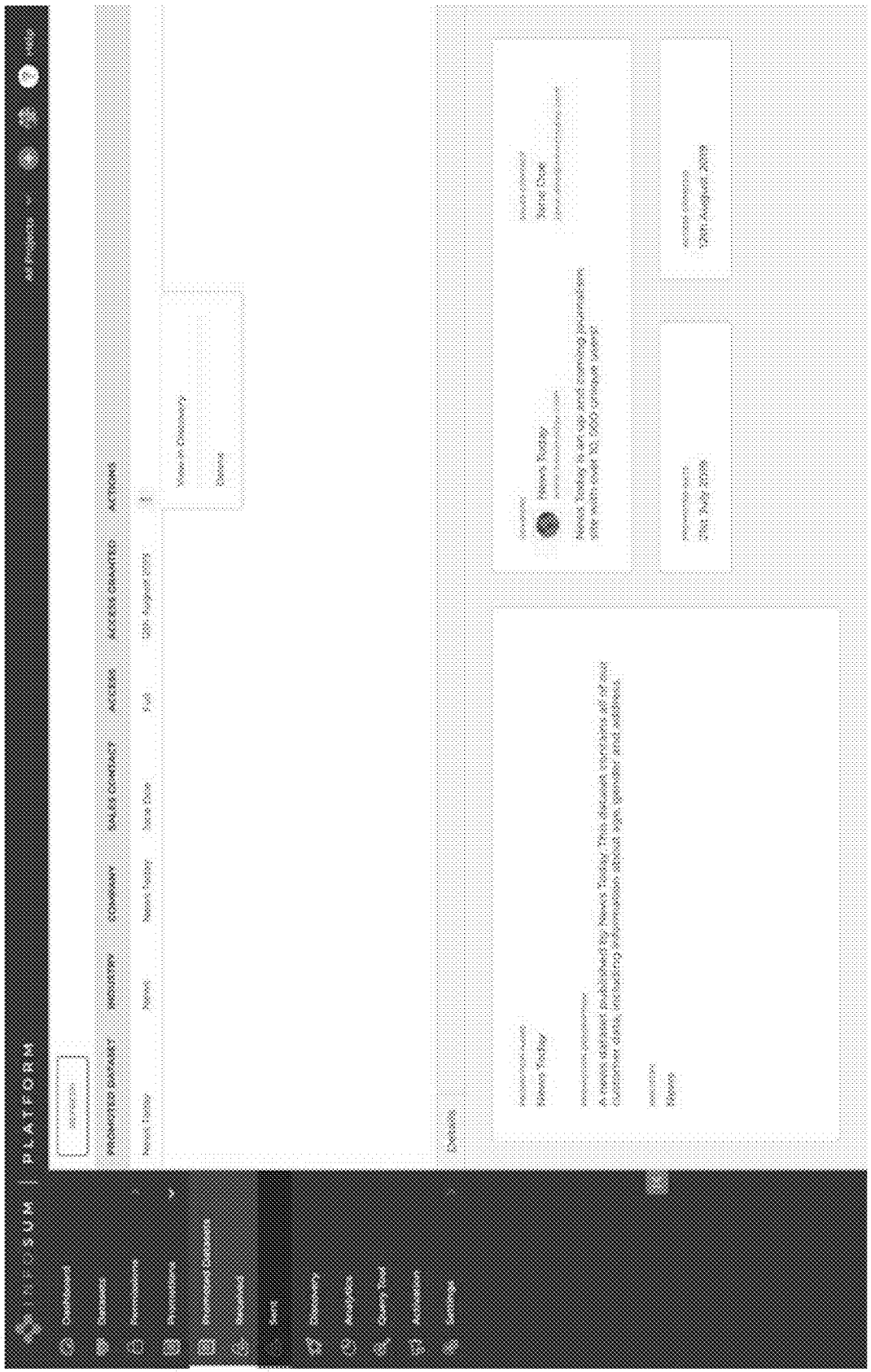

FIGS. 18*e* and 18*f* illustrate examples of how the granting of permission to access a dataset may be indicated to both a receiving user (FIG. 18*e*) and a sending user (FIG. 18*f*).

FIG. 18*e* shows an example of a "received" tab on the user interface as may be visible by the receiving user (the user who is being granted permission by the sending user). The receiving user can see that limited access has been granted to assess the value of LifeWeek's data against her own dataset. The user may or may not then, based on the assessment, request full access to the dataset.

FIG. 18f shows an example of a "sent" tab on the user interface as may be visible by the sending user (the use who is granting permission to the receiving user). The sending user can see the entities to whom they have granted permissions (both limited and full).

Figure 18G:

Once the user has selected an enrichment dataset to use to provide the category data, he may be navigated back to the analytics screen, now updated accordingly. An example is shown in FIG. 18g. Specifically, in this example, an enrichment dataset has been added which can provide the age information for some (but not all) of the entities (people) in the audience. Hence, in FIG. 18g, the age-related results are now shown. The quality indicator has also been updated to indicate that the coverage of the audience has gone down. This is because the enrichment dataset was able to provide age information for 3800 of the 5100 audience members.

The ternary bar at the top right of the page (the visual indicator) is the display of the results for the filtered audience. We would have similar commentary for an aggregate graph (age distribution for example) but they have quite different end results.

The lost data from a filter operation when we can't find the filter attribute for records has a material impact on the selected results (i.e. an accidental loss of records)

The lost data from an aggregation result in the case where we have records that don't have the attribute—just impact the quality/confidence of the graphing. i.e. lost records could skew the graph but might not have any impact if the attribute coverage is evenly distributed.

Figure 19A:
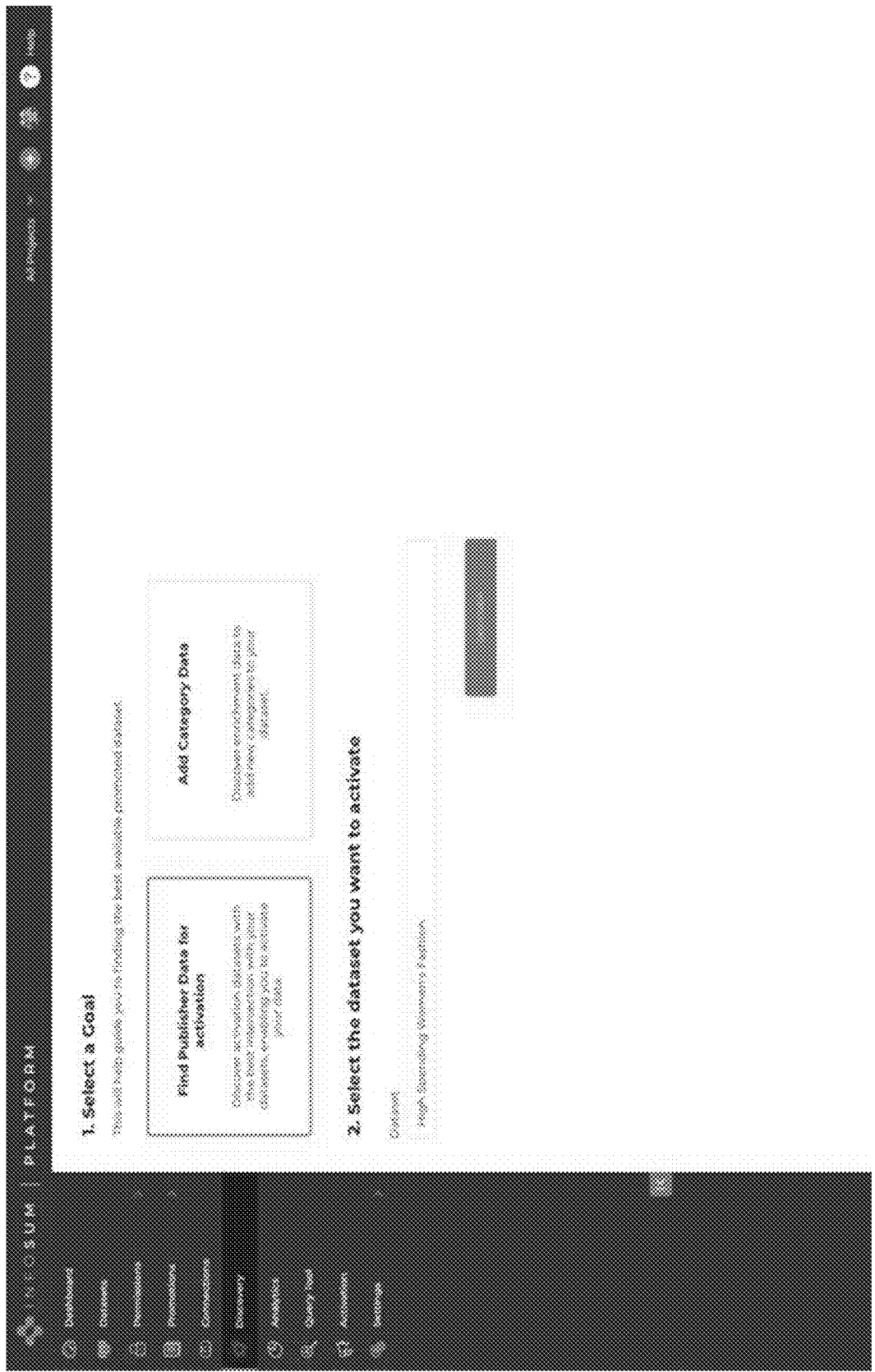
FIGS. 19a-b show example user interfaces for the purposes of selecting an activation dataset or tagging bunker.

FIG. 19a shows again the discovery tab as in FIG. 18b, but in this example the user has selected to find publisher data for activation. The user specifies his dataset and is then presented with a set of available activation datasets, as shown in FIG. 19b.

As mentioned, activation datasets (also called "tagging bunkers" or "identity datasets") are described in earlier U.S. patent Ser. No. 10/515,106. In particular, an activation dataset allows raw identifiers of entities to be determined from not raw (e.g. encoded) results of performing the operation on an audience as described in any of the examples herein. The activation datasets may not hold any attributes in association with any identifiers, but can be used to convert result into raw identifiers. In on example, the results of the operation are represented in an interrogation data structure (e.g. a bloom filter or HyperLogLog structure). The interrogation data structure is applied to encoded identifiers held in the activation dataset in order to identify raw identifiers in the activation datasets that correspond to identifiers encoded in the interrogation data structure.

Figure 19B:
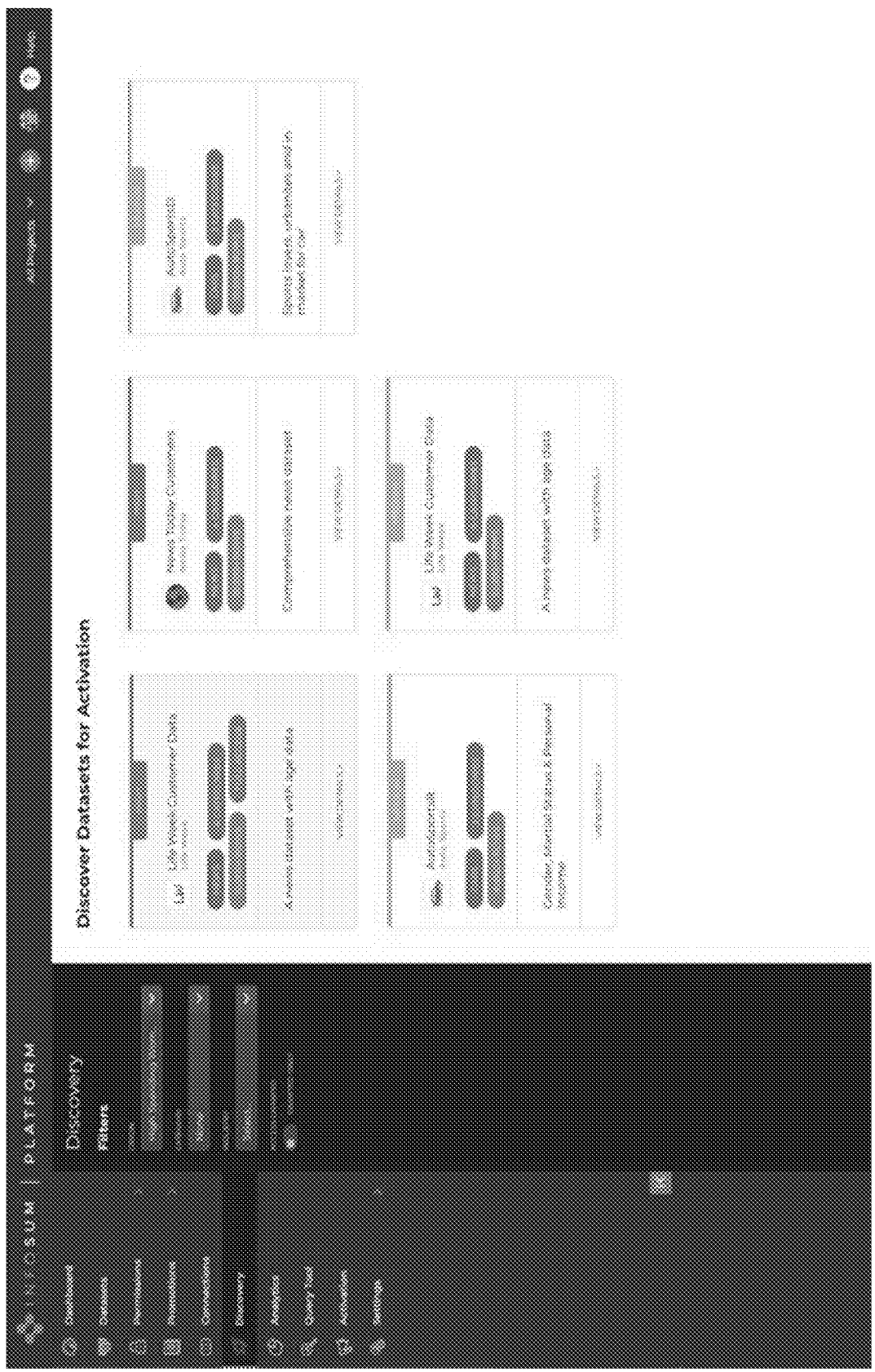

In this example, as shown in FIG. 19b, five illustrative activation datasets are shown as available. The user has selected "Life Week Customer Data" (e.g. the promoted dataset discussed above).

It is appreciated that it is generally desirable to maximise the conversion rate of the activation by an activation dataset (i.e. to be able to determine raw identifiers for as many of the result set as possible). The techniques described herein relating to improving audience coverage can also be used in this regard. For example, one or more via datasets may be used to convert keys between the query results and the activation dataset. In another example, two or more activation datasets may be used to activate the results. In such cases, the algorithm described above and illustrated in FIG. 15 may be used to partition the activation datasets into disjunctive normal form, and each partition can be activated separately (e.g. using different via datasets, etc.).

Figure 20:
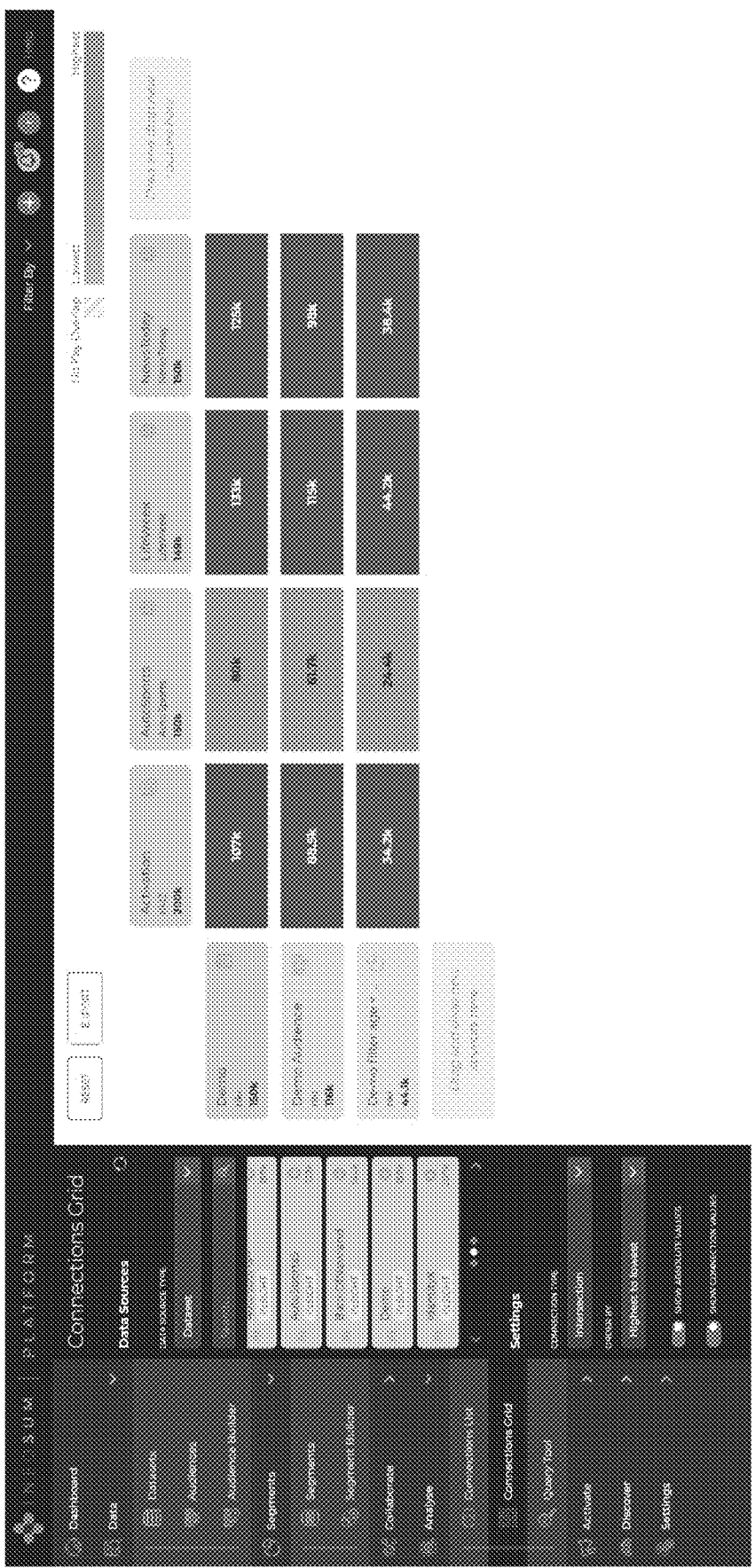
FIG. 20 shows an example user interface for presenting the user with a plurality of choices.

As discussed above, the user interface may present a visual representation of the application of the join intent with respect to a given further dataset. This can be done for more than one possible dataset in order to show the user the available options. An example is shown in FIG. 20 in which the user interface presents a plurality of visual indications, each representing the application of the join intent with respect to a different pair of a) a join intent and b) a supporting dataset. Specifically, the visual indications are presented in a table or matrix. The rows of the matrix correspond to the different join intents and the columns of the matrix correspond to the different possible supporting datasets. Each element in the matrix is a visual indication of the application of the join intent of that row with the supporting dataset of that column (in this example, the visual indication is the number of overlapping entries, with a backdrop colour to visually represent that number). This provides an easy to use and information-dense way to indicate the options to the user. The user may select an element from the matrix, and thereby select both a join intent and a supporting dataset.

In examples, the user interface may present a visual representation of the quality/coverage of a plurality of activation datasets with respect to a given set of result entries. The user is therefore able to essentially view the respective effectiveness of each activation dataset in converting his results into raw identifiers. The use may then select one (or more) of the activation datasets to use.

In further examples, the user interface may present a visual representation of the quality/coverage of a plurality of activation datasets with respect to a plurality of sets of result entries. The combinations of result entry set with activation dataset may be arranged in a table or matrix on the user interface (similar to shown in FIG. 20 and described above in relation to combinations of join intents and supporting datasets).

UI pages may provide different use cases:
1) Explore the resultant size of an audience interactively
e.g. What happens if I define my audience to be A Union B?
  Resultant audience is the distinct count of rows in both datasets, with key coverage issues, duplicated rows and the size of the intersection impacting the result and quality.
  (Via datasets may come into play here to improve quality of the results)
2) Explore insights about category information for data in my audience
e.g. Audience is defined as A Union B—and both A and B have Age and Income data—what is the distribution of age across my audience when filtered by Income.
  This is simple reporting and analytics. But quality and coverage still come into play as above—but with additional reporting on the coverage and quality of the category information.
  (Again Via datasets may come into play here)
3) Explore insights about category information for my audience using additional datasets to provide some or all the category information e.g. A Union B enrich with X OR Y—where A has some Age data but X and Y provide additional data and filtering by Income.
  The quality and coverage reporting here is the same as above—but with the addition of incremental gain information for the enrichment datasets.
  i.e. the audience has 40% coverage of age information but with dataset X we increase that to 70%.
  (Again Via datasets may be useful here).

4) Explore insights about category information for my audience using additional datasets to compare to baseline results to build look-a-likes.
  As above but with additional baseline queries to support comparative graph display.
  Quality and coverage information will also need to extend to include the quality of the baseline queries.
  (again Via datasets may be useful)
5) Explore insights about category information for my audience using additional datasets to then activate that audience through a further dataset.
  As above but additional quality and coverage information about the resultant audience post filtering and how that interacts with the activation dataset.
  This may just be the size of the audience that will actually be activated—but this can be extended to indicate how much audience has been lost in the final step to the activation dataset.

In all cases the addition of via datasets may trigger the need to show how they impact the coverage and quality of either the key or category information depending on why we are using them.
  The UI may provide the following features:
  1) Building an audience from disparate decentralised datasets—including the selection of enrichment and via datasets;
  2) Reporting the quality and coverage of these datasets as the audience is being built;
  3) Interactively building filters and seeing rendering of aggregate information;
  4) Interactively reporting the quality and coverage information as filters and aggregate information is displayed and an audience is segmented;
  5) Interactively reporting the quality and coverage information of the relationship to the activation dataset.

We can also break down the specifics of the quality and coverage information for all the different scenarios if that is appropriate.
  Other features include:
  The ability to specify the intent for the operation, whether that is for the purpose of evaluating the size/quality of the resultant audience or to subsequently then filter/aggregate against the intended audience;
  Reporting size/quality information as you build an audience (specifying the intent);
  Reporting the size/quality information as you filter with attributes that may or may not be provided by your intent datasets (therefore adding enrichment datasets);
  Exploring which datasets would provide the best quality/coverage for enrichment of an attribute vs the intended audience.
  The following options are also possible.
  An audience definition can be formed from a number of datasets using any combination of set operations.
  This audience defines the ideal target for any further operation a customer wants performed, whether this is insight analysis or possibly an identity/tagging activation.
  The majority of output quality metrics will be driven from how much coverage or accuracy has been achieved against this target audience.
  The operation between the target audience and any enrichment or via dataset may be an intersection when trying to provide information matching rows in the target audience.
  Any additional rows in enrich or via datasets that do not match with rows in the target audience contain information may not be of interest.
  Almost all use cases for activation will also only involve intersections as well—but there are cases where other set operations may be performed, e.g. suppression (exclude). E.g. define a target audience and wish to send target advertising to everyone in a dataset, excluding all the defined target audience.
  Exploring which datasets would provide the best quality/coverage for enrichment of an attribute vs the intended audience.
  Further exploring which activation datasets would provide the best quality/coverage for a specified intended audience or filtered audience for the purpose of delivery activation/raw identities.

The following features may also be provided:
  A method of accessing first and second independent datasets to generate a target audience, the method comprising:
    generating a user interface having input means for a user to select first and second independent data sets from a plurality of datasets accessible to the user, each of the first and second datasets having a plurality of data entries, each data entry having at least one key and optionally at least one attribute associated with the key, the user interface being configured to receive from the user a query defining a join intent, wherein the join intent defines a join operation to be performed on entries of the first and second data sets to generate the target audience, the method comprising performing the join operation by:
    searching the first independent dataset using a filtering expression to obtain a filtering set of entries matching the filtering expression;
    applying identifiers only of the filtering set of entries to the second dataset to access corresponding entries of the second dataset; and
    generating a set of result entries from the second dataset which satisfy join intent and the filtering expression.

In some embodiments a filtering expression may not be utilised/needed.

The user interface may be configured to receive the filtering expression and the optionally an aggregation expression for aggregating the result entries.

In an example, the join intent is one of exclude/union/intersect.

In an example, aggregation is count/average/max number. Other options for the aggregation include top-n or count-by-bins aggregation functions.

The method may comprise generating on the user interface a visual representation by labelled icons, respectively denoting different join intents and the visual representation of the application of the join intent to database icons representing respective databases.

The method may comprise generating a visual indicator representing the status of the results of the data aggregation, the visual indicator comprising: a first indication of entries in the filtering set satisfying the filtering expression; a second indication of a total number of entries in the first dataset (and optionally the second dataset) having an attribute matching the filter expression data; and a third indication of the number of entries of the first (and optionally second) databases which do not have an attribute matching the filtering expression.

In an example, the visual indicator has visual distinct regions identifying relative proportions of the first, second and third indications.

The following features may also be provided:

A method of accessing multiple independent data sets to generate results satisfying at least one first expression, the method comprising:
  generating a user interface having input means for a user to select:
    (i) at least one audience dataset, the at least one audience data set having a plurality of data entries, at least some of the data entries having at least one key and at least one attribute associated with the key, the at least one attribute matching the first expression;
    (ii) a group of candidate supporting datasets, each having a plurality of data entries having at least one key and at least one additional item associated with the key;
    (iii) a join intent defining a data aggregation operation to be performed on the audience and candidate supporting databases;
  receiving at a processor executing a data aggregation algorithm respective dataset identifiers of the at least one audience data set and each of the group of candidate supporting datasets, the identifiers associated with an indicator of the keys and the attribute(s) of the audience database and an indicator of the keys and additional items of the candidate supporting databases;
  wherein the data aggregation algorithm carries out the steps of:
    selecting one or more of the group of complimentary datasets according to optimisation criteria based on at least one quality metric for the data aggregation operation pertaining to the join intent;
    searching the at least one audience data set or one or more selected ones of the group of complimentary datasets using the at least one first expression to obtain a filtering set of entries matching the at least one first expression;
    applying identifiers only of the filtering set of entries to one or more of the selected complimentary datasets to search amongst the filtering set of entries only for result entries and aggregating the result entries;
    determining the value of the at least one quality metric based on the aggregated result entries; and
    comparing the value of the at least one quality metric with a threshold to provide an output indication of quality of the data aggregation operation.

The algorithmic optimisation described herein is described in the context of the audience dataset(s) and the supporting datasets. The actions described may also be used in the case of selecting from a set of supporting datasets for the purpose of adding to the audience—and reporting on the quality measures as that is done.

Filtering and aggregation may be optional—they are not required in all embodiments.

In an example, each of the candidate supporting datasets has a user defined quality metric, and the user selection is based on the user defined quality metric, the user defined quality metric indicating a value of the at least one key and/or the or each category of each candidate supporting data set when used in association with the at least one audience data set to generate results satisfying the at least one first expression.

In an example, a second expression is used for aggregation of results when accessing the second database.

In an example, the result entries are applied to an identity database holding raw identifiers of entries in the audience dataset, which specify a join intent.

In an example, the identifiers are also applied to a second audience dataset prior to aggregating the result entries.

Aspects of the present invention enable a user to more clearly define their intent when running a query, and to provide quality information related to that intent to allow an automated process to make a more sophisticated selection of datasets.

For example, with the prior systems, if a query is run using a filter expression (such as age) against a first dataset A to generate a filtering set of identifiers for running against a second dataset B with a target attribute, it is not possible to ascertain from the results whether a small number of results means that the original dataset A was an incorrect dataset (for example, had no entries containing age) or a dataset in which entries did contain age, but which did not satisfy the filtering criteria (for example, age less than 40). Furthermore, it does not enable a distinction to be made as to whether in fact they were entries which did satisfy the filtering attribute criteria (for example, age less than 40), but none of the identifiers satisfying that entry matched keys in the second dataset B.

Embodiments of the invention address these issues from a number of perspectives.

Firstly, they provide information to a user on a user interface which allows a user intent to be clearly defined and which provides visual quality indicators.

Secondly, an optimisation algorithm may be provided to select suitable supporting datasets from the candidate supporting datasets which may be made available to enrich a source dataset in a filtering or aggregation operation. The supporting datasets may be utilised by effecting a join operation between the source dataset and the one or more supporting datasets in the manner described in WO 2018/096062 such that raw data does not have to be moved.

The selection of the supporting datasets from the candidate supporting datasets may be based on the intent of the user. This is particularly advantageous when compared with prior enrichment techniques which do not take into account the target audience as defined by the intent of the user. Quality indicators may be generated after the query has been executed using the selected supporting datasets, and compared with a quality metric. If the quality metric is not satisfied, the algorithm may execute again to define a different set of supporting databases. Additionally and/or alternatively, an indication of the quality may be presented to the user such that the user may manually trigger a further query or accept the results that have been given to him with the quality indicator.

A query may take a number of different forms. A query may be defined at a user interface as described later, or may be in the form of a data structure. The data structure may have been generated by an earlier query on a different target audience.

The invention claimed is:

1. A method of accessing a dataset to fulfill a query over a target audience, the method comprising:
  generating a user interface for rendering on a display of a computer device, the user interface comprising input means for a user to select an intended audience dataset from a plurality of datasets which the user has permission to access, each dataset having a plurality of data entries, each data entry having at least one key, the user interface being configured to receive from the user the query defining an intended operation to be performed on entries of the intended audience dataset to generate the target audience;

receiving the query from the user;

selecting a candidate dataset from a plurality of candidate datasets;

determining whether the selected candidate dataset comprises entries which enhance the entries of the intended audience dataset for performing the intended operation, wherein enhancing the entries comprises adding to a number of entries in the intended audience dataset from the selected candidate dataset, and the intended operation defines a join intent on the intended audience dataset and at least one further dataset of the plurality of datasets which the user has permission to access;

if so, selecting the selected candidate dataset and the intended audience dataset to contribute to performance of the intended operation;

if not, selecting a next candidate dataset from the plurality of candidate datasets and repeating the determining step;

selecting one or more of the plurality of candidate datasets based on at least one quality metric for a data aggregation operation pertaining to the join intent;

searching the at least one intended audience dataset using at least one first expression to obtain a filtered set of entries matching the at least one first expression;

applying identifiers only of the filtered set of entries to the selected one or more of the plurality of candidate datasets to search for matching result entries within the selected one or more of the plurality of candidate datasets and aggregating the matching result entries;

determining a value of the at least one quality metric based on the aggregated result entries; and comparing the value of the at least one quality metric with a threshold to provide an output indication of quality of the data aggregation operation via the user interface.

2. The method according to claim 1, comprising configuring the user interface to receive a user indication of the join intent.

3. The method according to claim 1, wherein the join intent is selected from one or more of an exclude operation, a union operation and an intersection operation.

4. The method according to claim 1, wherein the at least one candidate dataset comprises one or more of:

an enrichment dataset storing attribute information for at least one of the entries in the intended target audience dataset;

a via dataset storing associations between keys of a type present in the intended target audience dataset and keys of a type present in a further dataset to be joined with the intended target audience dataset, or associations between keys of a type present in the intended target audience dataset and keys of a type present in the enrichment dataset.

5. The method according to claim 1, wherein the intended operation is a filtering operation on attributes associated with the entries of the intended audience dataset.

6. The method according to claim 1, wherein the user interface is configured to receive an expression for the data aggregation operation.

7. The method according to claim 1, comprising generating on the user interface one or more of:

a visual representation of the join intent;

a visual representation of application of the join intent with the at least one further dataset;

for a plurality of different further datasets of the plurality of dataset:

a respective visual representation of application of the join intent with a respective further dataset, a visual representation of results of a filtering expression, a respective icon visually representing the respective further dataset, and a visual indicator representing status of a data aggregation, the visual indicator comprising:

a first indication of a number of entries in the target audience having an attribute matching the filtering expression;

a second indication of a total number of entries in the target audience having an attribute not matching the filtering expression; and a third indication of a number of entries in the target audience not having an attribute matching the filtering expression.

8. The method according to claim 7, comprising receiving user input confirming selection of one of the plurality of further datasets, and using the confirmed further dataset and the intended audience dataset 7 contribute to performance of the intended operation.

9. The method according to claim 7, wherein the visual indicator has visually distinct regions identifying relative proportions of the first, second and third indications.

10. The method according to claim 1, wherein each of the plurality of candidate datasets has a user-defined quality metric, and the at least one candidate dataset is selected based on the user-defined quality metric, the user-defined quality metric indicating a value of the at least one key or a category of each candidate dataset when used to enhance the entries in the intended target audience.

11. The method according to claim 1, comprising applying result entries resulting from performing the intended operation to an identity database holding raw identifiers of entries in the intended audience.

12. The method according to claim 1, comprising applying result entries resulting from performing the intended operation to an additional audience dataset prior to aggregating the result entries.

13. The method according to claim 12, comprising using a query expression for aggregating of the result entries.

14. The method according to claim 13, wherein the intended operation comprises a data aggregation operation to be performed on the taret audience and a selected candidate database.

15. A computer program product comprising computer-executable instructions stored on a non-transitory storage medium configured to perform a method of accessing a dataset to fulfill a query over a target audience, the method comprising:

generating a user interface for rendering on a display of a computer device, the user interface comprising input means for a user to select an intended audience dataset from a plurality of datasets which the user has permission to access, each dataset having a plurality of data entries, each data entry having at least one key, the user interface being configured to receive from the user the query defining an intended operation to be performed on entries of the intended audience dataset to generate the target audience;

receiving the query from the user;

selecting a candidate dataset from a plurality of candidate datasets;

determining whether the selected candidate dataset comprises entries which enhance the entries of the intended audience dataset for performing the intended operation, wherein enhancing the entries comprises adding to a number of entries in the intended audience dataset from the selected candidate dataset, and the intended operation defines a join intent on the intended audience dataset and at least one further dataset of the plurality of datasets which the user has permission to access;

if so, selecting the selected candidate dataset and the intended audience dataset to contribute to performance of the intended operation;

if not, selecting a next candidate dataset from the plurality of candidate datasets and repeating the determining step;

selecting one or more of the plurality of candidate datasets based on at least one quality metric for a data aggregation operation pertaining to the join intent;

searching the at least one intended audience dataset using at least one first expression to obtain a filtered set of entries matching the at least one first expression;

applying identifiers only of the filtered set of entries to the selected one or more of the plurality of candidate datasets to search for matching result entries within the selected one or more of the plurality of candidate datasets and aggregating the matching result entries;

determining a value of the at least one quality metric based on the aggregated result entries; and comparing the value of the at least one quality metric with a threshold to provide an output indication of quality of the data aggregation operation via the user interface.

16. A computing device, implemented at least partially by hardware, for accessing a dataset to fulfill a query over a target audience, the computing device comprising:

a display; and a controller configured to:

generate a user interface for rendering on the display, the user interface comprising input means for a user to select an intended audience dataset from a plurality of datasets which the user has permission to access, each dataset having a plurality of data entries, each data entry having at least one key, the user interface being configured to receive from the user the query defining an intended operation to be performed on entries of the intended audience dataset to generate the target audience;

receive the query from the user;

select a candidate dataset from a plurality of candidate datasets;

determine whether the selected candidate dataset comprises entries which enhance the entries of the intended audience dataset for performing the intended operation, wherein enhancing the entries comprises adding to a number of entries in the intended audience dataset from the selected candidate dataset, and the intended operation defines a join intent on the intended audience dataset and at least one further dataset of the plurality of datasets which the user has permission to access;

if so, select the selected candidate dataset and the intended audience dataset to contribute to performance of the intended operation;

if not, select a next candidate dataset from the plurality of candidate datasets and repeating the determining step;

select one or more of the plurality of candidate datasets based on at least one quality metric for a data aggregation operation pertaining to the join intent;

search the at least one intended audience dataset using at least one first expression to obtain a filtered set of entries matching the at least one first expression;

apply identifiers only of the filtered set of entries to the selected one or more of the plurality of candidate datasets to search for matching result entries within the selected one or more of the plurality of candidate datasets and aggregating the matching result entries;

determine a value of the at least one quality metric based on the aggregated result entries; and compare the value of the at least one quality metric with a threshold to provide an output indication of quality of the data aggregation operation via the user interface.

* * * * *